(12) United States Patent
Jeon et al.

(10) Patent No.: US 10,958,664 B2
(45) Date of Patent: Mar. 23, 2021

(54) METHOD OF PERFORMING INTEGRITY VERIFICATION BETWEEN CLIENT AND SERVER AND ENCRYPTION SECURITY PROTOCOL-BASED COMMUNICATION METHOD OF SUPPORTING INTEGRITY VERIFICATION BETWEEN CLIENT AND SERVER

(71) Applicant: Samsung Electronics Co., Ltd., Suwon-si (KR)

(72) Inventors: Sang-hoon Jeon, Hwaseong-si (KR); Won-jae Lee, Hwaseong-si (KR); Hyung-sup Kim, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 252 days.

(21) Appl. No.: 16/135,290

(22) Filed: Sep. 19, 2018

(65) Prior Publication Data
US 2019/0098016 A1    Mar. 28, 2019

(30) Foreign Application Priority Data

Sep. 22, 2017 (KR) .................. 10-2017-0122884
Jan. 8, 2018 (KR) .................. 10-2018-0002141

(51) Int. Cl.
*H04L 9/08* (2006.01)
*H04L 9/32* (2006.01)
(Continued)

(52) U.S. Cl.
CPC ............ *H04L 63/123* (2013.01); *G06F 21/64* (2013.01); *H04L 9/0825* (2013.01);
(Continued)

(58) Field of Classification Search
None
See application file for complete search history.

(56) References Cited

U.S. PATENT DOCUMENTS 7,418,484 B2 * 8/2008 Presley ............... H04L 41/0266
709/220
7,434,253 B2 10/2008 Crall et al.
(Continued)

FOREIGN PATENT DOCUMENTS

KR    10-2005-0078837 A    8/2005
KR    10-0674566 B1    1/2007
(Continued)

*Primary Examiner* — Fatoumata Traore
(74) *Attorney, Agent, or Firm* — Harness, Dickey & Pierce, P.L.C.

(57) ABSTRACT

An encryption security protocol-based communication method of supporting integrity verification between a client and a server includes receiving, by the server, a first message from the client, the first message including a request for a first integrity verification of the client so as to start a handshake of a transport layer security (TLS) connection, transmitting, by the server, a second message to the client, the second message including a request for first verification information for the first integrity verification, receiving, by the server, the first verification information from the client, and performing the first integrity verification by using the first verification information, and finishing the handshake and performing data communication between the client and the server based on a result of the first integrity verification.

17 Claims, 29 Drawing Sheets

(51) Int. Cl.
*H04L 29/06* (2006.01)
*G06F 21/64* (2013.01)

(52) U.S. Cl.
CPC .......... *H04L 9/0897* (2013.01); *H04L 9/3226* (2013.01); *H04L 9/3236* (2013.01); *H04L 9/3247* (2013.01); *H04L 9/3263* (2013.01); *H04L 9/3273* (2013.01); *H04L 63/0428* (2013.01); *H04L 63/0823* (2013.01); *H04L 63/166* (2013.01); *H04L 67/42* (2013.01)

(56) References Cited

U.S. PATENT DOCUMENTS

| | | |
|---|---|---|
| 8,327,441 B2 | 12/2012 | Kumar et al. |
| 8,856,317 B2 | 10/2014 | Robertson et al. |
| 9,602,537 B2 | 3/2017 | Petty |
| 10,454,689 B1 * | 10/2019 | Sharifi Mehr ........ H04L 63/166 |
| 10,462,116 B1 * | 10/2019 | Sharifi Mehr ...... H04L 63/0428 |
| 2009/0019528 A1 * | 1/2009 | Wei ...................... H04L 9/3247 726/4 |
| 2015/0039891 A1 * | 2/2015 | Ignatchenko ........... G06F 21/53 713/171 |
| 2017/0318011 A1 | 11/2017 | Yoo et al. |

FOREIGN PATENT DOCUMENTS

| | | |
|---|---|---|
| KR | 10-1082917 B1 | 11/2011 |
| KR | 10-2014-0043068 A | 4/2014 |
| KR | 10-2014-0098872 A | 8/2014 |
| KR | 10-1720630 B1 | 3/2017 |
| KR | 10-1746102 B1 | 6/2017 |

* cited by examiner

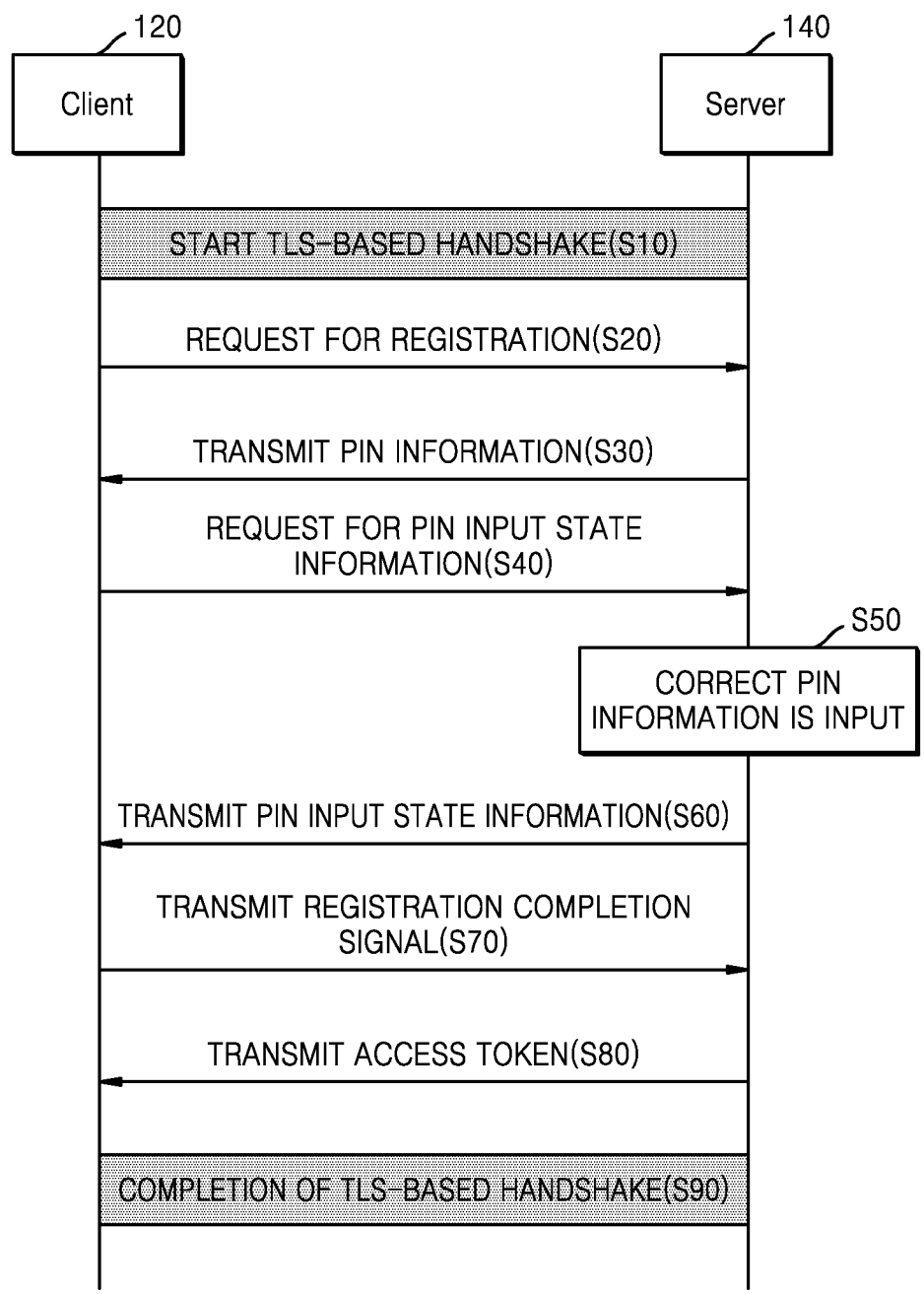

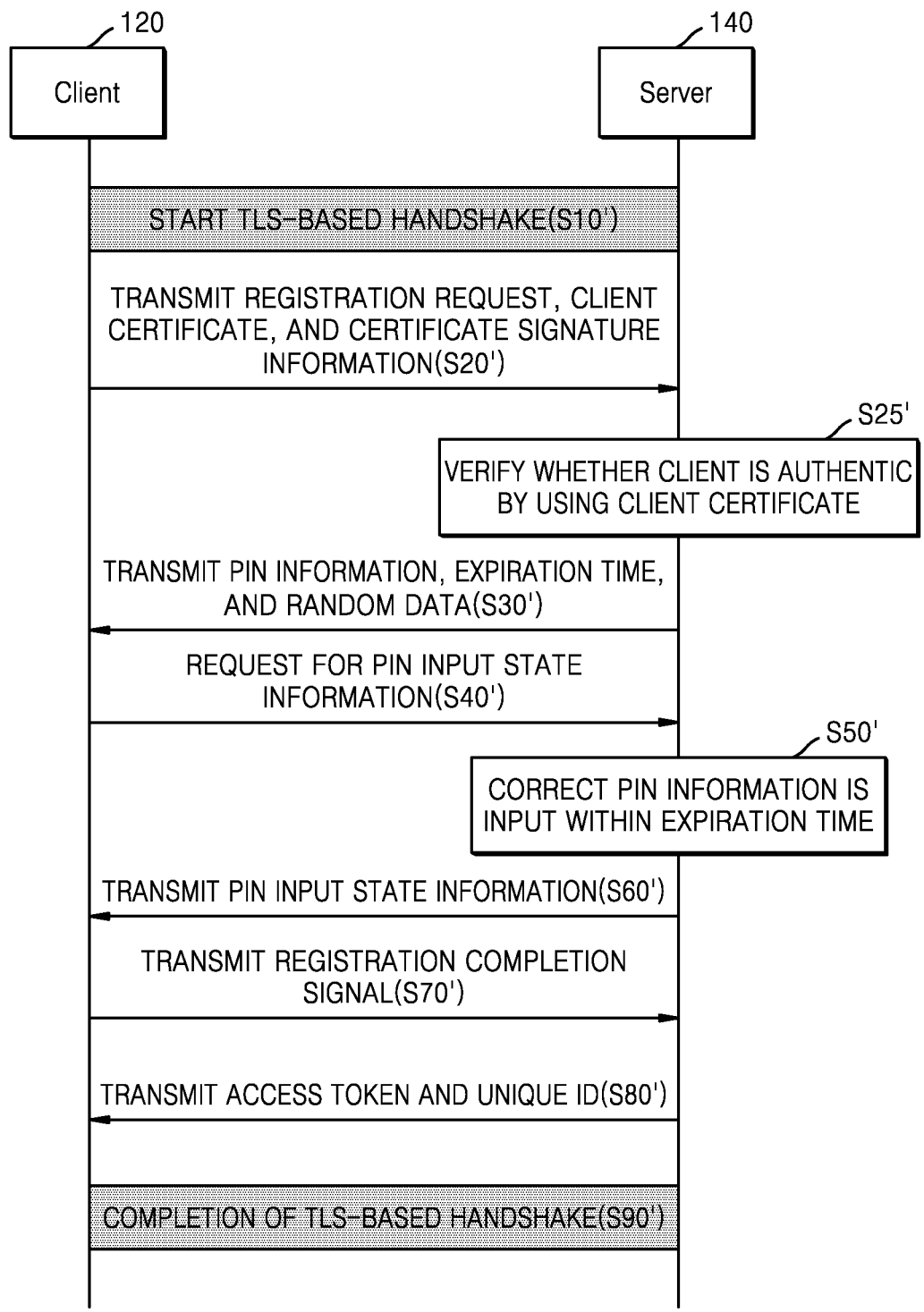

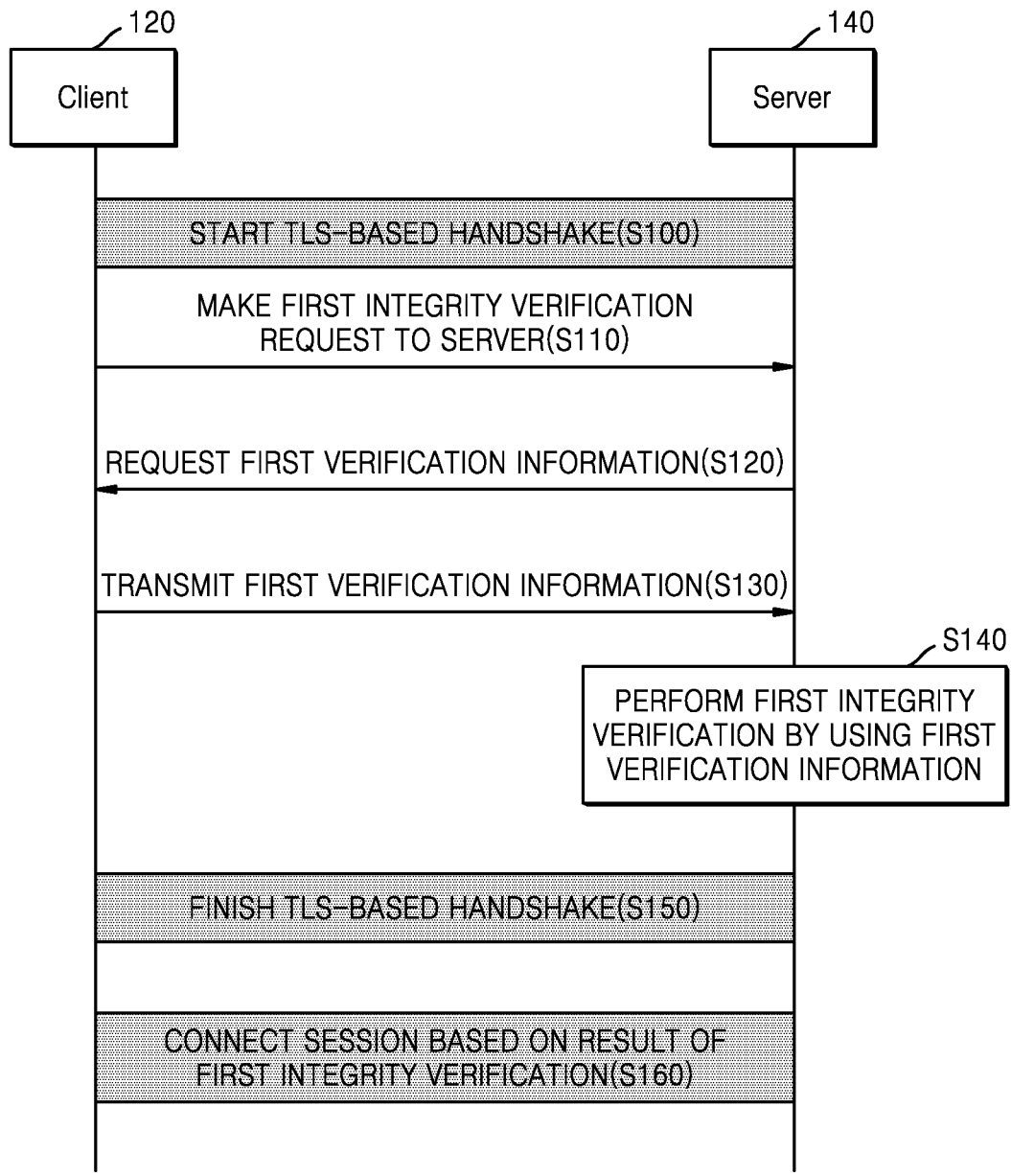

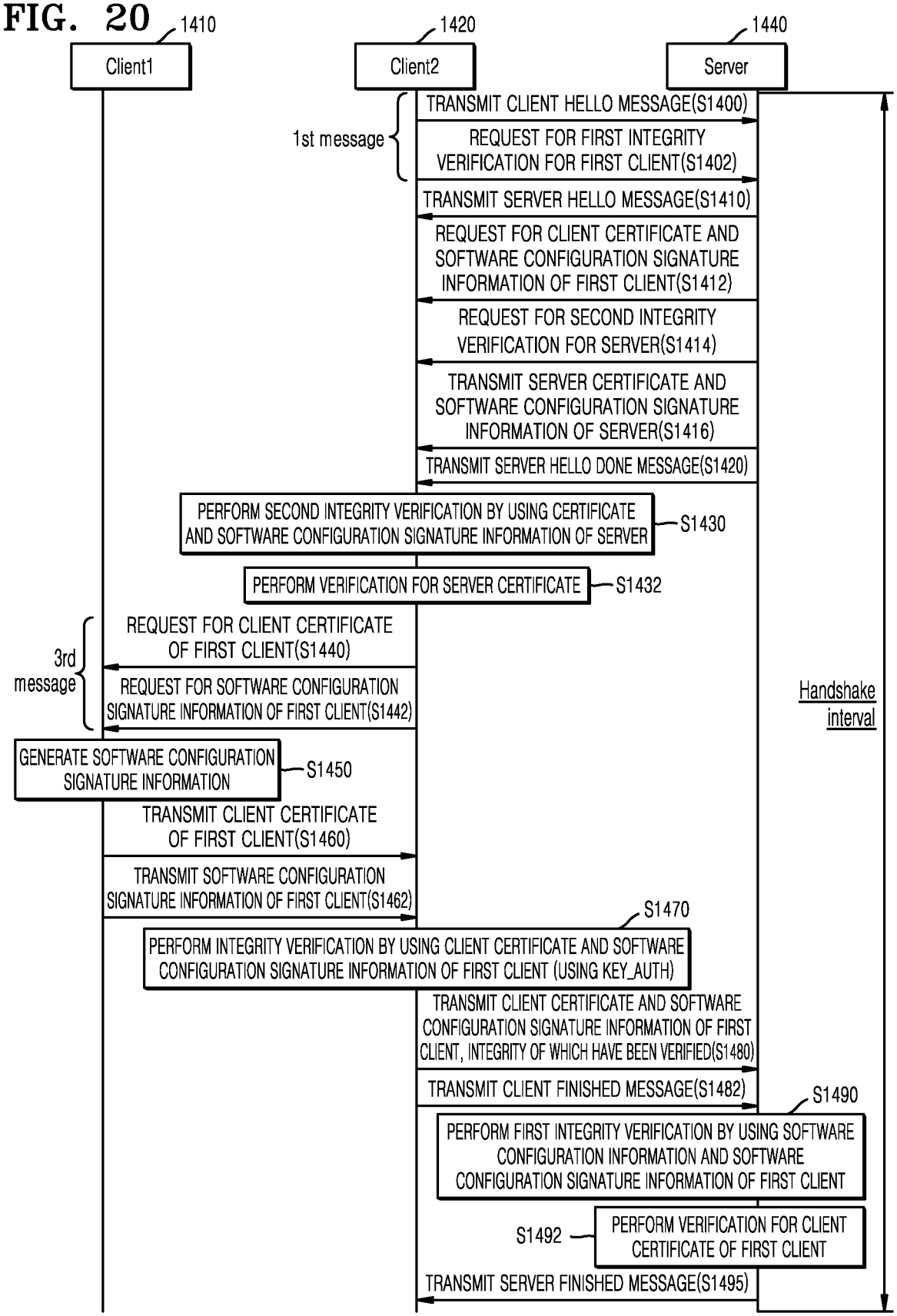

METHOD OF PERFORMING INTEGRITY VERIFICATION BETWEEN CLIENT AND SERVER AND ENCRYPTION SECURITY PROTOCOL-BASED COMMUNICATION METHOD OF SUPPORTING INTEGRITY VERIFICATION BETWEEN CLIENT AND SERVER

CROSS-REFERENCE TO RELATED APPLICATIONS

This application claims the benefit of Korean Patent Application Nos. 10-2017-0122884, filed on Sep. 22, 2017 and 10-2018-0002141, filed on Jan. 8, 2018, in the Korean Intellectual Property Office, the disclosures of which are incorporated herein in their entirety by reference.

BACKGROUND

The inventive concepts relate to a method of registering with a server of a client and a method of performing integrity verification between the client and the server, and more particularly, to a method of registering a client in a server in communication between the client and the server based on an encryption security protocol, and efficiently performing integrity verification of the client and/or the server.

Transport layer security (TLS) or secure sockets layer (SSL) is an encryption security protocol that provides Internet communication security. The TLS and the SSL protocols may use an asymmetric encryption scheme for authentication and key exchange, and may use a symmetric encryption scheme for confidentiality. In particular, the TLS protocol may be the Internet Engineering Task Force (IETF) standard protocol defined in Request for Comments (RFC) 5246 and RFC 6176.

In an existing conventional client-server computing system, when communication is performed between a client and a server based on a standard TLS protocol, integrity verification of the client and the server is not able to be performed together at the same time. Thus, to verify the integrity of the client and the server in a conventional client-server computing system, it is necessary to perform separate integrity verification by using predetermined message authentication codes. Consequently, since radio frequency (RF) resources of the client-server computing system need to be utilized whenever separate integrity verification is performed, the use of the RF resources is not efficient.

In addition, in a conventional client-server computing system, an integrity verification method using the TLS protocol may be applicable only when an end-node device (a client) is able to communicate with a server via a direct connection. However, the client may not be directly connected to the server in many cases. For example, when the server is connected to a cloud via wireless fidelity (Wi-Fi), etc., the client may not support Wi-Fi due to limited resources therein. Thus, integrity verification may not be performed by the server for the client that is not directly connectable to the server. Furthermore, in such a case where the client does not have a direct connection with the server, the client may not be registered in the server.

Therefore, an improved integrity verification method capable of more efficiently utilizing RF resources is needed (or desirable). An improved registration and integrity verification method capable of registering and verifying integrity of a client that does not have a direct connection with a server is also needed (or desirable).

SUMMARY

The inventive concepts provide a method of securely registering a client in a server in a client-server computing system and a method of performing integrity verification between the client and the server to efficiently utilize radio frequency (RF) resources of the client-server computing system.

The inventive concepts also provide a hub device which may support server registration and integrity verification of an end-node device that is not directly connectable to the server. The hub device may have a direct connection with the server, and may communicate with both the server and the end-node device (a first client). The hub device (a second client) may use a certificate or software configuration information of the first client to perform integrity verification with the server on behalf of the first client.

According to some example embodiments of the inventive concepts, in a case where a client is directly connectable to a server, there is provided an encryption security protocol-based communication method of supporting integrity verification between a client and a server, the encryption security protocol-based communication method including receiving, by the server, a first message from the client, the first message including a request for a first integrity verification of the client so as to start a handshake of a transport layer security (TLS) connection, transmitting, by the server, a second message to the client, the second message including a request for first verification information for the first integrity verification, receiving, by the server, the first verification information from the client, and performing the first integrity verification by using the first verification information, finishing the handshake, and performing data communication between the client and the server based on a result of the first integrity verification.

According to some example embodiments of the inventive concepts, in a case where a first client is not directly connectable to a server, there is provided an integrity verification method of performing integrity verification of a first client by using an encryption security protocol-based communication, the integrity verification method including: transmitting, by a second client connected to the first client via a network, to a server, a first message comprising a request for a first integrity verification of the first client so as to start a handshake of a transport layer security (TLS) connection; receiving, by the second client, a second message comprising a request for first verification information of the first client for the first integrity verification of the first client; and transmitting, by the second client, the first verification information of the first client to the server.

According to some example embodiments of the inventive concepts, in a case where a client is directly connectable to a server, there is provided a server registration method of a client by using an encryption security protocol-based communication, the server registration method including: transmitting, from the client to a server, a registration request for the client so as to start a handshake of a transport layer security (TLS) connection; receiving, by the client from the server, personal identification number (PIN); transmitting, from the client to the server, a request for PIN authentication result information indicating whether the PIN information has been correctly input to the server; receiving, by the client from the server, the PIN authentication result information upon the PIN information being correctly input to the server; and receiving, by the client from the server, an access token comprising a right of the client to access the server.

According to some example embodiments of the inventive concepts, in a case where a first client is not directly connectable to a server, there is provided a server registration method of a first client using an encryption security protocol-based communication, the server registration method of the first client including: transmitting, from a second client to the server, a registration request for the first client so as to start a handshake of a transport layer security (TLS) connection; receiving, by the second client from the server, personal identification number (PIN) information, and transmitting, from the second client to the first client, the received PIN information; transmitting, from the second client to the server, a request for PIN authentication result information indicating whether the PIN information has been correctly input to the server; receiving, by the second client from the server, the PIN authentication result information upon the PIN information being input to the server; and receiving by the second client from the server, an access token comprising a right of the first client to access the server, and transmitting, from the second client to the first client, the received access token.

According to some example embodiments of the inventive concepts, there is provided a server registration method of a server using an encryption security protocol-based communication, the server registration method of the server including: receiving, by the server from a client, a registration request for the client so as to start a handshake of a transport layer security (TLS) connection; transmitting, from the server to the client, personal identification number (PIN) information for the client by allocating the PIN information to the client in response to the registration request; transmitting, from the server to the client, PIN authentication result information indicating that the PIN information has been authenticated by the server upon the PIN information being correctly input to the server; and transmitting, from the server to the client, an access token comprising a right of the client to access the server. In some example embodiments, the client may be the end-node device (the first client) having a direct connection with the server. In some other example embodiments, the client may be the hub device (the second client) acting on behalf of the first client that does not have a direct connection with the server.

BRIEF DESCRIPTION OF THE DRAWINGS

Some example embodiments of the inventive concepts will be more clearly understood from the following detailed description taken in conjunction with the accompanying drawings in which:

FIG. 2 is a flow diagram for explaining an operation of a client-server computing system performing server registration of a client, according to some example embodiments;

FIG. 3 is a flow diagram for explaining an operation of a client-server computing system performing server registration of a client, according to some other example embodiments;

FIG. 4 is a flow diagram for describing an operation of a client-server computing system that performs integrity verification, according to some example embodiments;

FIG. 20 is a flow diagram of a verification operation in a handshake interval between a first client, a second client, and a server, according to some example embodiments.

DETAILED DESCRIPTION

Hereinafter, some example embodiments of the inventive concepts will be described in detail with reference to the accompanying drawings. Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, or in some cases be performed in reverse order.

A client-server structure may enable various roles, operations, and the like of a computing system to be distributed to a plurality of independent computing systems connected through a network. A client may be software that is executed on client platforms or client devices, and a server may be software that is executed on server platforms or server devices. However, the inventive concepts are not limited thereto. The client may be defined as the term indicating physical hardware devices on which client-related software is executed, and the server may be defined as the term indicating physical hardware devices on which server-related software is executed.

Figure 1A:
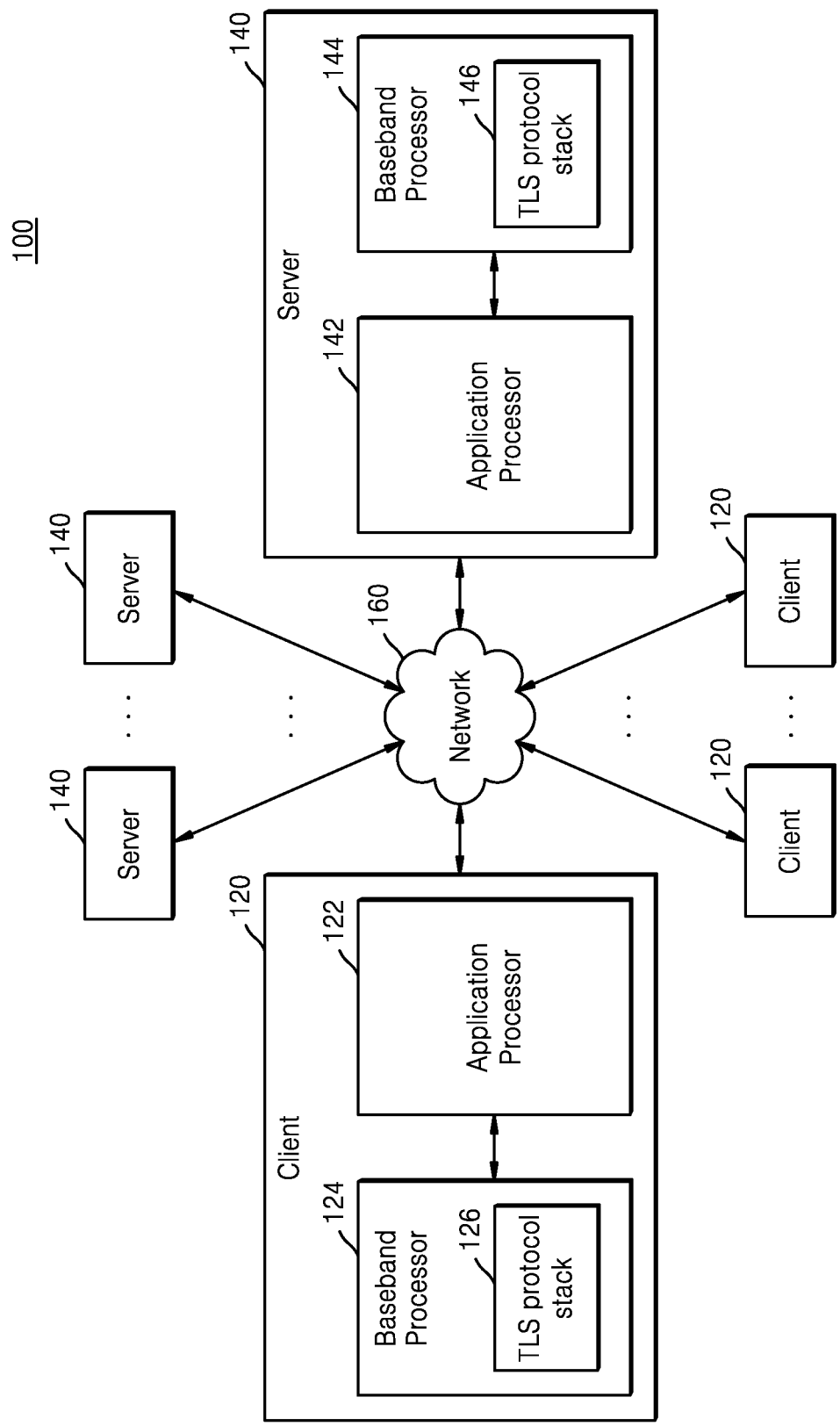
FIG. 1A is a schematic block diagram of a client-server computing system, according to some example embodiments.

FIG. 1A is a schematic block diagram of a client-server computing system 100 according to some example embodiments.

Referring to FIG. 1A, the client-server computing system 100 may include a plurality of clients (or a plurality of client computing devices) 120 and a plurality of servers (or a plurality of server computing devices) 140, and the clients 120 and the servers 140 may be connected through a network 160.

The client-server computing system 100 may be an Internet of things (IoT) network system. The clients 120 may be IoT devices, and the servers 140 may be hub devices (or access points) or routers, according to some example embodiments. Also, the client-server computing system 100 may be a cloud computing security system. The servers 140 may be cloud service providing servers that provide a cloud service, and the clients 120 may be devices that use the cloud service, according to some example embodiments.

The client-server computing system 100 may correspond to one of a ubiquitous sensor network (USN) communication system, a machine type communication (MTC) system, a machine oriented communication (MOC) system, a machine to machine (M2M) communication system, and a device to device (D2D) communication system. For communication between the client 120 and the server 140, the client-server computing system 100 may use a transport protocol such as a user datagram protocol (UDP) or a transmission control protocol (TCP), an IPv6 Internet routing protocol, and an application protocol such as a constrained application protocol (CoAP), a hypertext transfer protocol (HTTP), a message queue telemetry transport (MQTT), or an MQTT for sensor networks (MQTT-SN).

The clients 120 may communicate with the servers 140 through a wired or wireless interface, or may communicate with each other through a wired or wireless interface. The wired or wireless interface may include a modem communication interface connectable to a local area network (LAN), a wireless local area network (WLAN) such as wireless fidelity (Wi-Fi), a wireless personal area network (WPAN) such as Bluetooth, wireless universal serial bus (wireless USB), ZigBee, near field communication (NFC), radio-frequency identification (RFID), power line communication (PLC), or a mobile cellular network such as 3rd Generation (3G), 4th Generation (4G), or Long Term Evolution (LTE).

For example, the client 120 and the server 140 may perform data communication to transmit and receive data signals through the network 160. Specifically, the client 120 and the server 140 may be connected to each other through an encryption security protocol. This may prevent a third party from hacking the communication between the client 120 and the server 140 (or may at least reduce a risk of exposure of the data being communicated), and may thereby secure data integrity. The encryption security protocol used for the communication between the client 120 and the server 140 may be a secure socket layer (SSL) protocol or a transport layer security (TLS) protocol. The following description will focus on the client-server computing system 100 using the TLS protocol, although this is only a non-limiting example, and some example embodiments of the inventive concepts are not limited thereto.

The client 120 may include an application processor 122 and a baseband processor 124. The baseband processor 124 may include a TLS protocol stack 126 for performing TLS-based communication between the client 120 and the server 140. The application processor 122 may control a series of operations for connecting the client 120 and the server 140 based on the TLS protocol stack 126. Also, the application processor 122 may provide higher layer function processing (for example, an application layer and/or a transport layer), and the baseband processor 124 may provide lower layer function processing (for example, a physical layer and/or a network layer).

The server 140 may include an application processor 142 and a baseband processor 144. The baseband processor 144 may include a TLS protocol stack 146 for performing TLS-based communication between the server 140 and the client 120. The application processor 142 may control a series of operations for connecting the server 140 and the client 120 based on the TLS protocol stack 146. Also, the application processor 142 may provide higher layer function processing, and the baseband processor 144 may provide lower layer function processing.

Figure 1B:
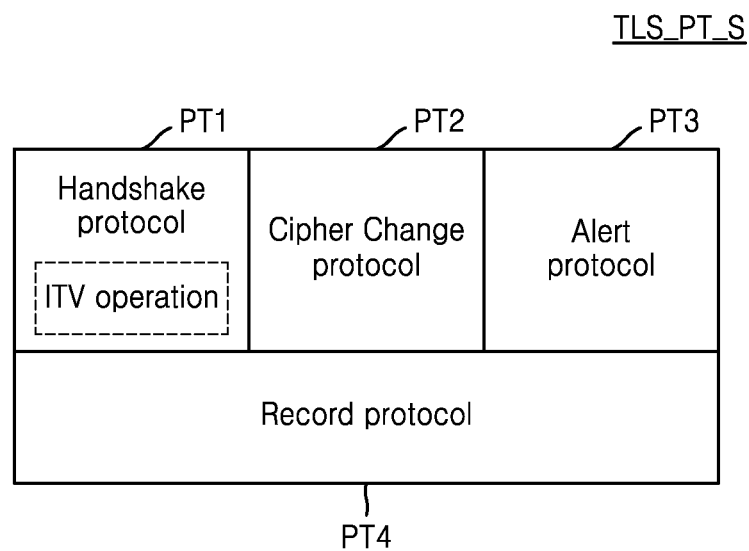
FIG. 1B is a diagram for describing a transport layer security (TLS) protocol stack of FIG. 1A, according to some example embodiments.

FIG. 1B is a diagram for describing protocols included in the TLS protocol stacks 126 and 146 of FIG. 1A, according to some example embodiments.

Referring to FIG. 1B, the TLS protocol stack TLS_PT_S may include a handshake protocol PT1, a cipher change protocol PT2, an alert protocol PT3, and a record protocol PT4. The TLS protocol stack TLS_PT_S is the standard protocol of the International Engineering Task Force (IETF), and some example embodiments may comply with the standard protocol of the IETF.

The client 120 and the server 140 may perform a handshake for a TLS connection between the client 120 and the server 140 based on the handshake protocol PT1. The client 120 and the server 140 may share a method of encrypting data transmitted and received between the client 120 and the server 140 in the handshake interval, TLS version information, and the like with each other. Also, the client 120 and the server 140 may perform authentication of the client 120 and the server 140 based on the handshake protocol PT1.

The client 120 and the server 140 may inform each other that security communication will be performed by applying parameters determined as a result of the handshake between the client 120 and the server 140 based on the cipher change protocol PT2. The client 120 and the server 140 may report to each other errors occurring during the security communication based on the alert protocol PT3. The client 120 and the server 140 may share a transaction layer based on the record protocol PT4, and this may indicate that a session is connected between the client 120 and the server 140. The client 120 and the server 140 may transmit and receive encrypted data therebetween through the session (or the transaction layer) based on the record protocol PT4.

According to some example embodiments, an integrity verification (ITV) operation for the client 120 and the server 140 may be defined in the handshake protocol PT1. In the handshake interval between the client 120 and the server 140, the client 120 and the server 140 may optionally perform data integrity verification of each other based on the handshake protocol PT1. Specifically, the client 120 may verify the integrity of the server 140 based on the handshake protocol PT1 in an interval during which the handshake with the server 140 is performed. Also, the server 140 may verify the integrity of the client 120 based on the handshake protocol PT1 in an interval during which the handshake with the client 120 is performed. Also, in the handshake interval between the client 120 and the server 140, the client 120 and the server 140 may optionally perform an authentication operation on each other based on the handshake protocol PT1. Then, the session between the client 120 and the server 140 may be connected based on at least one of the integrity verification result and the authentication result.

Since the TLS-based communication operation between the client 120 and the server 140, according to some example embodiments, may further perform the integrity verification on the client 120 and the server 140 in the handshake interval, a separate interval requiring the use of radio frequency (RF) resources in the client-server computing system 100 need not be configured so as to perform the integrity verification, thereby enabling more efficient use of the RF resources, as compared to the conventional client-server computing systems. Also, since the integrity verification result of the client 120 or the server 140 may be reflected in connecting the session between the client 120 and the server 140, the communication security between the client 120 and the server 140 is improved over the conventional client-server computing systems.

FIG. 2 is a flow diagram of an operation of the client-server computing system 100 performing server registration of a client, according to some example embodiments.

Referring to FIG. 2, the client 120 and the server 140 may start a TLS-based handshake (S10). In other words, the client 120 and the server 140 may start a handshake based on a handshake protocol of a TLS protocol stack.

The client 120 may transmit a registration request for the client 120 to the server 140 to start the handshake of a TLS connection (S20). Registration of the client 120 may indicate registering the client 120 in the server 140 to gain access to the server 140.

In response to the registration request received from the client 120, the server 140 may transmit personal information number (PIN) information to the client 120 (S30). The server 140 may verify whether the client 120 is authentic before transmitting the PIN information to the client 120, as described with reference to FIG. 3.

Upon receiving the PIN information from the server 140, the client 120 may transmit a PIN authentication result information request to the server 140 (S40). PIN authentication result information may be PIN input state information indicating whether the PIN information has been correctly input to the server 140. For example, as the client 120 receives the PIN information from the server 140, the client 120 may transmit the PIN information to a user of the client 120 via a display device (not illustrated) including at least one of a visual display device and an auditory display device included in the client 120. The user may input the PIN information to the server 140 after obtaining the PIN information via the display device. The client 120 may determine whether the PIN information input to the server 140 by the user matches the PIN information transmitted to the client 120. When the PIN information transmitted to the client 120 matches the PIN information input by the user, the PIN information may be determined by the server 140 to have been correctly input by the user. The client 120 may transmit the PIN authentication result information request to the server 140 to verify whether the PIN information has been correctly input.

The PIN information may be input to the server 140 by the user (S50). When correct PIN information is input, the server 140 may transmit to the client 120 the PIN authentication result information (PIN input state information) indicating that the correct PIN information has been input (S60). The client 120 may verify that the correct pin information has been input, by receiving the PIN authentication result information indicating that the correct PIN information has been input.

The client 120 may transmit a registration completion signal to the server 140 in response to receiving the PIN authentication result information (S70). The server 140 may transmit to the client 120 an access token including a right to access the server 140 by the client 120 as the server 140 receives the registration completion signal from the client 120 (S80). Thereafter, the client 120 may access the server 140 by using the access token.

Then, the client 120 and the server 140 may complete the TLS-based handshake (S90).

According to the server registration method of the client using the encryption secure protocol-based communication, the client 120 may be securely registered in the server 140 by registering the client 120 in the server 140 in the handshake interval, according to some example embodiments. Since a separate interval requiring the use of RF resources in the client-server computing system 100 need not be configured so as to perform the integrity verification, which is otherwise required in a conventional client-server computing system, the server registration method of the client using the encryption secure protocol-based communication according to FIG. 2 enables more efficient use of the RF resources as compared to the conventional client-server computing systems.

FIG. 3 is a flow diagram of an operation of a client-server computing system performing the server registration of the client 120, according to some other example embodiments.

Referring to FIG. 3, the client 120 and the server 140 may start the TLS-based handshake (S10'). In other words, the client 120 and the server 140 may start the handshake based on the handshake protocol of the TLS protocol stack.

The client 120 may transmit the registration request for the client 120 to the server 140 to start the handshake of the TLS connection, and transmit to the server 140 a certificate and certificate signature information of the client 120 together with the registration request (S20').

The server 140 may verify whether the client 120 is authentic, by using the certificate and the certificate signature information of the client 120 (S25'). For example, the server 140 may decrypt the certificate signature information of the client 120 by using a public key of a certification authority that has issued the certificate of the client 120, and verify the certificate of the client 120 by comparing a decrypted value with information about certified attributes of the certificate of the client 120. When the certificate of the client 120 is verified, the server 140 may determine that the client 120 is authentic.

The server 140 may transmit the PIN information to the client 120 and may transmit a PIN information expiration time together with the PIN information to the client 120 (S30'). The PIN information expiration time may indicate a time interval during which the PIN information is maintained valid. The PIN information expiration time may include several seconds to several minutes as the time interval. In this case, the PIN information may be valid during the PIN information expiration time. However, some example embodiments are not limited thereto. For example, the server 140 may transmit to the client 120 the PIN information expiration time indicating an absolute expiration time. In this case, the PIN information may be valid until the PIN information expiration time is over. In addition, the server 140 may also transmit random data to the client 120 in operation S30', for further security enhancement.

Upon receiving the PIN information from the server 140, the client 120 may transmit a PIN authentication result information request to the server 140 (S40'). The PIN authentication result information may be PIN input state information indicating whether the PIN information has been correctly input to the server 140 within the pin information expiration time.

The PIN information may be input to the server 140 by the user within the PIN information expiration time (S50'). When the correct PIN information has been input within the PIN information expiration time, the server 140 may transmit to the client 120 the PIN authentication result information (PIN input state information) indicating that the correct PIN information has been input (S60'). The client 120 may verify that the correct pin information has been input, by receiving the PIN authentication result information indicating that the correct PIN information has been input.

The client 120 may transmit the registration completion signal to the server 140 in response to receiving the PIN authentication result information (S70'). As the server 140 receives the registration completion signal from the client 120, the server 140 may transmit to the client 120 the access token including the right to access the server 140, together with a unique identifier (ID) to identify the client 120 (S80'). Thereafter, the client 120 may access the server 140 by using the access token and the unique ID.

Then, the client 120 and the server 140 may complete the TLS-based handshake (S90').

According to the server registration method of the client using the encryption secure protocol-based communication according to some example embodiments, the client 120 may be securely registered in the server 140 by registering the client 120 in the server 140 in the handshake interval. Again, since a separate interval requiring the use of RF resources in the client-server computing system 100 need not be configured so as to perform the integrity verification, which is otherwise required in a conventional client-server computing system, the server registration method of the client using the encryption secure protocol-based communication according to FIG. 3 enables more efficient use of the RF resources, as compared to the conventional client-server computing systems.

FIG. 4 is a flow diagram for describing the operation of the client-server computing system that performs the integrity verification, according to some example embodiments.

Referring to FIG. 4, in operation S100, the client 120 and the server 140 may start the TLS-based handshake. That is, the client 120 and the server 140 may start the handshake based on the handshake protocol of the TLS protocol stack. In operation S110, the client 120 may make a first integrity verification request to the server 140. The first integrity verification may mean integrity verification of the client 120. In operation S120, the server 140 may request first verification information for the first integrity verification from the client 120 in response to the first integrity verification request. In operation S130, the client 120 may transmit the first verification information to the server 140 in response to the request for the first verification information. The first verification information may include software configuration information of the client 120 and software configuration signature information generated by the client 120, according to some example embodiments. Details thereof will be described below. In operation S140, the server 140 may perform the first integrity verification of the client 120 by using the first verification information received from the client 120. In operation S150, the client 120 and the server 140 may finish the TLS-based handshake. In operation S160, a session between the client 120 and the server 140 may be connected based on a result of the first integrity verification. For example, when the integrity of the client 120 is not confirmed, the session between the client 120 and the server 140 is not connected, and only when the integrity of the client 120 is confirmed, the session between the client 120 and the server 140 is connected to thereby enable encrypted data communication. In addition, as a non-limiting example, when the integrity of the client 120 is not verified, the server 140 may communicate with the user's cell phone, etc. to notify the user that the client 120 has been attacked by external malicious software. The malicious software may be referred to as malware, and the malware as a non-limiting example may include at least one of computer viruses, worms, Trojan horses, spyware, dishware adware, scareware, crimeware, other malicious software, and other malicious programs.

However, only example embodiments of the server 140 verifying the integrity of the client 120 have been described with reference to FIG. 4, but example embodiments of the inventive concepts are not limited thereto. The client 120 may also verify the integrity of the server 140 according to some other example embodiments, and details thereof will be described below.

Figure 5:
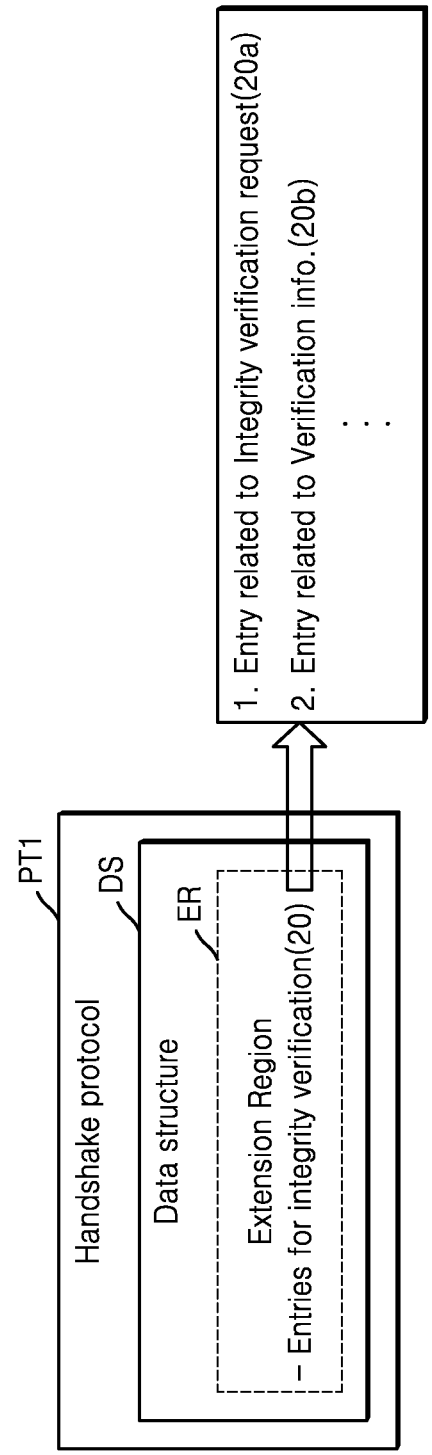
FIG. 5 is a diagram for describing a handshake protocol of FIG. 1B, according to some example embodiments.

FIG. 5 is a diagram for describing the handshake protocol PT1 of FIG. 1B, according to some example embodiments.

Referring to FIG. 5, the handshake protocol PT1 is a protocol for a handshake method between a client and a server. The contents of the handshake protocol PT1 may be defined in a code format in a data structure DS corresponding to the handshake protocol PT1. That is, the application processor of the client and the application processor of the server may perform a handshake between the client and the server by referring to the data structure DS corresponding to the handshake protocol PT1.

The data structure DS corresponding to the handshake protocol PT1 may include an extension region ER in which an operation additionally performed in a handshake interval may be defined. According to some example embodiments, entries 20 for integrity verification may be defined in the extension region ER. According to some example embodiments, the entries 20 for integrity verification may include an entry 20a related to an integrity verification request and an entry 20b related to integrity verification information. Specifically, the client or the server may request integrity verification from the other party by referring to the entry 20a related to the integrity verification request, and the client or the server may generate verification information by referring to the entry 20b related to the verification information for integrity verification and transmit the verification information to the other party. That is, the client and/or the server may perform integrity verification in the handshake interval between the client and the server by referring to the entries 20 for integrity verification defined in the extension region ER of the data structure DS. In this manner, the client and the server may perform integrity verification in the handshake interval in accordance with the IETF standard protocol.

However, the entries 20a and 20b defined in the extension region ER of FIG. 5 are only a non-limiting example, and some example embodiments of the inventive concepts are not limited thereto. Various other entries for verifying the integrity of the client and/or the server may be defined in the extension region ER.

Figure 6A:
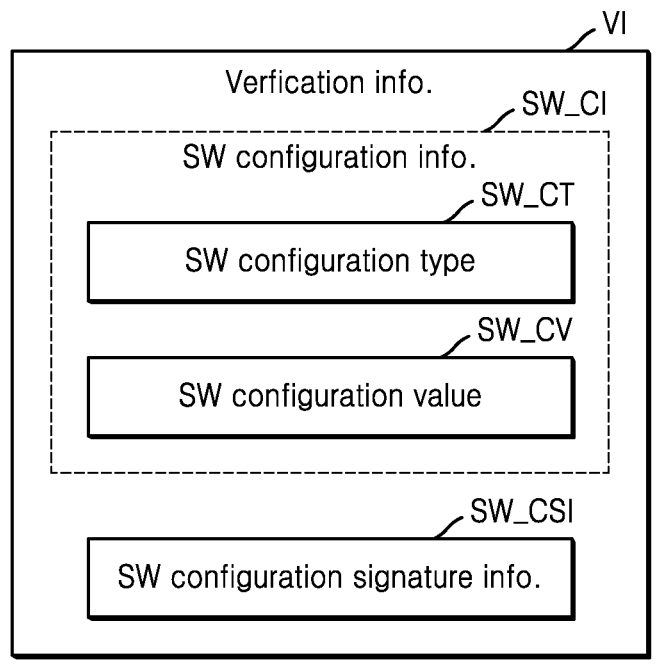
FIG. 6A is a diagram for describing verification information necessary for integrity verification, according to some example embodiments.
Figure 6B:
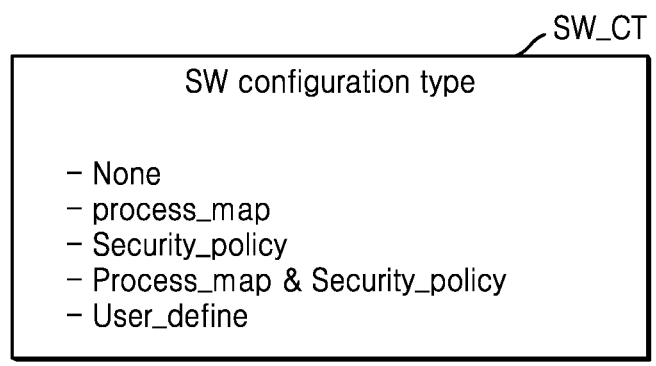
FIG. 6B is a diagram for describing a software configuration type of FIG. 6A, according to some example embodiments.

FIG. 6A is a diagram for describing verification information VI for integrity verification, according to some example embodiments. FIG. 6B is a diagram for describing a software configuration type SW_CT of FIG. 6A, according to some example embodiments.

Referring to FIG. 6A, the verification information VI for performing integrity verification may include software configuration information SW_CI and software configuration signature information SW_CSI. According to some example embodiments, the software configuration information SW_CI may include software configuration type information SW_CT and a software configuration value SW_CV corresponding to a software configuration type. The software configuration type information SW_CT may be information for specifying a subject on which whether a value has been changed is to be confirmed at the time of integrity verification. For example, the server may perform the integrity verification of the client by determining whether the software configuration value SW_CV corresponding to the software configuration type information SW_CT of the client has been changed. The software configuration type information SW_CT may indicate a software configuration type set in advance for integrity verification, and the software configuration type may be variously set.

When the client receives a request for the software configuration signature information SW_CSI, the client may generate the software configuration signature information SW_CSI in response to the request for the software configuration signature information SW_CSI. The client may generate the software configuration signature information SW_CSI in a secure execution environment inside the client. The secure execution environment may include a trusted execution environment (TEE) as an environment that is not accessible from the outside. A method of generating the software configuration signature information SW_CSI will be described with reference to FIG. 9.

Referring to FIG. 6B, the software configuration type information SW_CT may indicate that the software configuration type is set to one of a non-configuration type (None), a process-map type (Process_map), a security policy type (Security_policy), a process map-security policy type (Process_map & Security_policy), and a user-defined type (User_define).

Figure 6C:
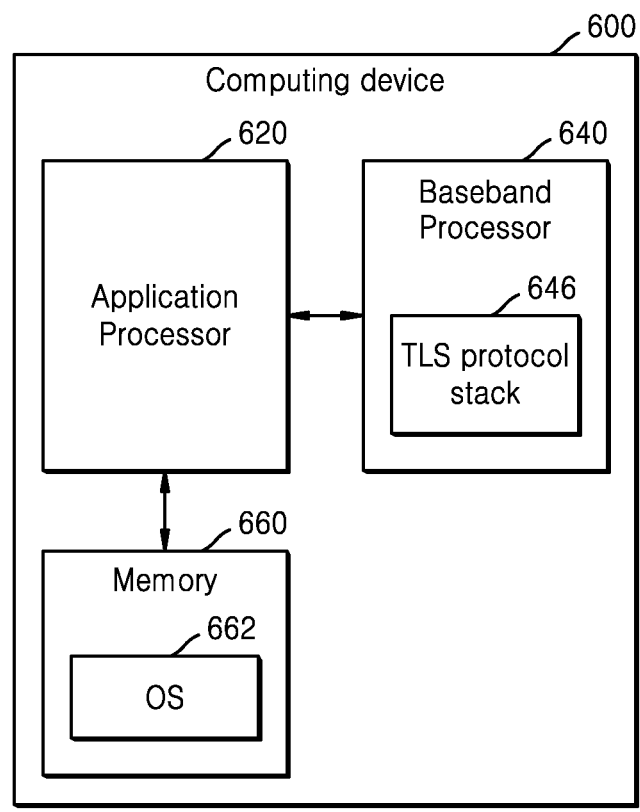
FIGS. 6C and 6D are block diagrams of a client or server computing device, according to some example embodiments.
Figure 6D:
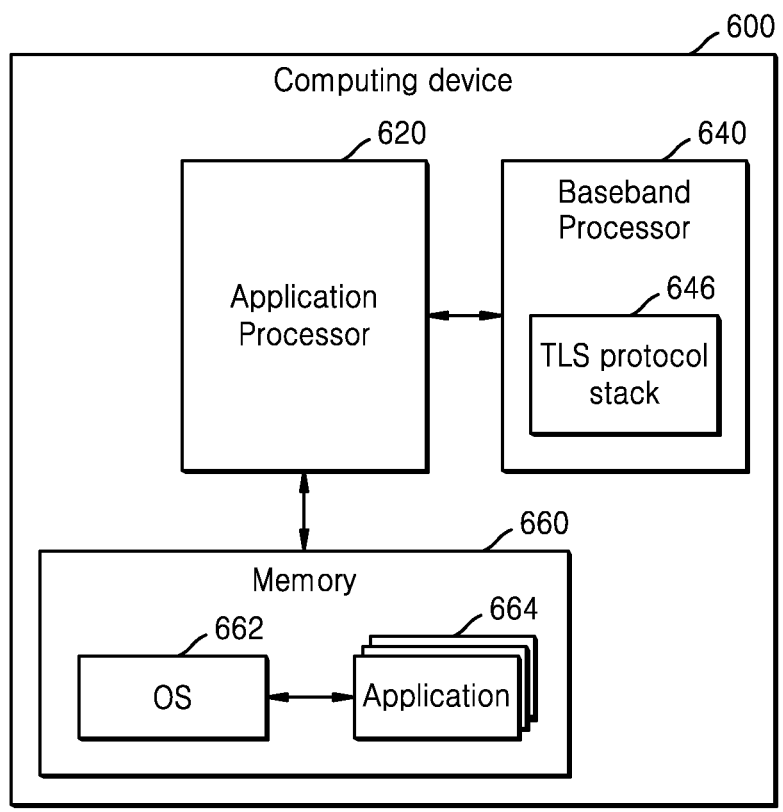

FIGS. 6C and 6D are block diagrams of a client or server computing device 600, according to some example embodiments.

Referring to FIG. 6C, a client or server computing device 600 may include an application processor 620, a baseband processor 640 with a TLS protocol stack 646, and a memory 660. The memory 660 may store an operating system (OS) 662, and the application processor 620 may read the memory 660 and execute the OS 662. According to some example embodiments, the OS 662 executed by the application processor 620 may manage the security of the computing device 600 based on a predetermined (or desired) security policy. The security policy may include configuration information about a system configuration file and configuration information about a memory protection technique. When specified as a subject on which whether a configuration value of the security policy of the OS 662 has been changed for integrity verification is confirmed, the software configuration type information SW_CT may be set as the security policy type (Security_policy).

Referring to FIG. 6D, the memory 660 may store the OS 662 and a plurality of applications 664. A process map may include information about a code region on the memory 660 of the computing device 600 and information about system execution files (for example, execution files related to the applications 664). When specified as a subject on which whether a configuration value of the process map has been changed for integrity verification is confirmed, the software configuration type information SW_CT may be set as the process map type (Process_map).

When specified as a subject on which whether a mixed configuration value including the configuration value of the security policy of the OS 662 described with reference to FIG. 6C and the configuration value of the process map has been changed for integrity verification is confirmed, the software configuration type information SW_CT may be set as the process map-security policy type (Process_map & Security_policy). Furthermore, the integrity may be verified by using a software configuration value designated by a user, besides the security policy type and the process-map type. In this case, the software configuration type information SW_CT may be set as a user-defined type (User_define). However, the contents of FIG. 6B are only a non-limiting example, and example embodiments of the inventive concepts are not limited thereto. In some other example embodiments, the software configuration type information SW_CT may be set as various other types according to a situation.

Figure 7A:
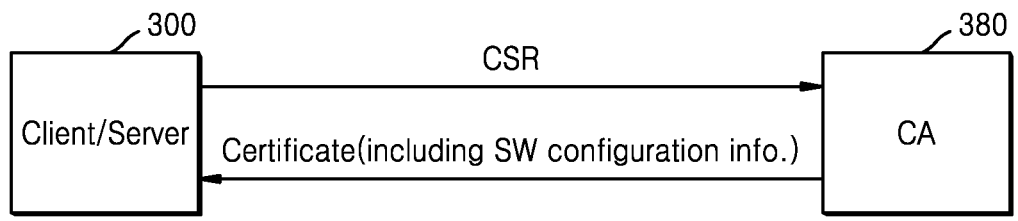
FIG. 7A is a block diagram for describing a certificate issuing method, according to some example embodiments.
Figure 7B:
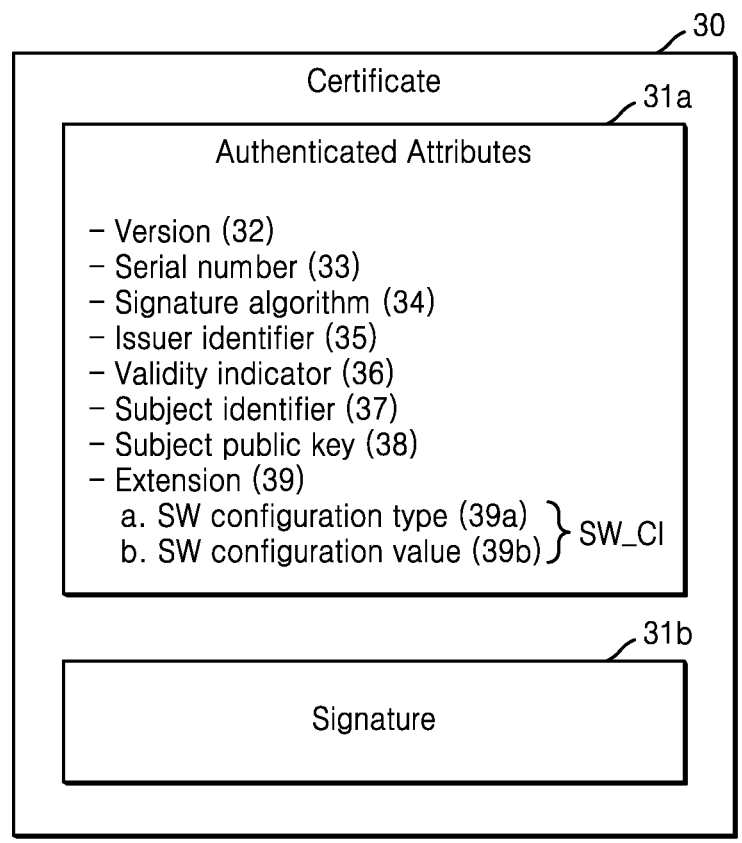
FIG. 7B is a diagram for describing integrity verification-related information included in a certificate, according to some example embodiments.
Figure 7C:
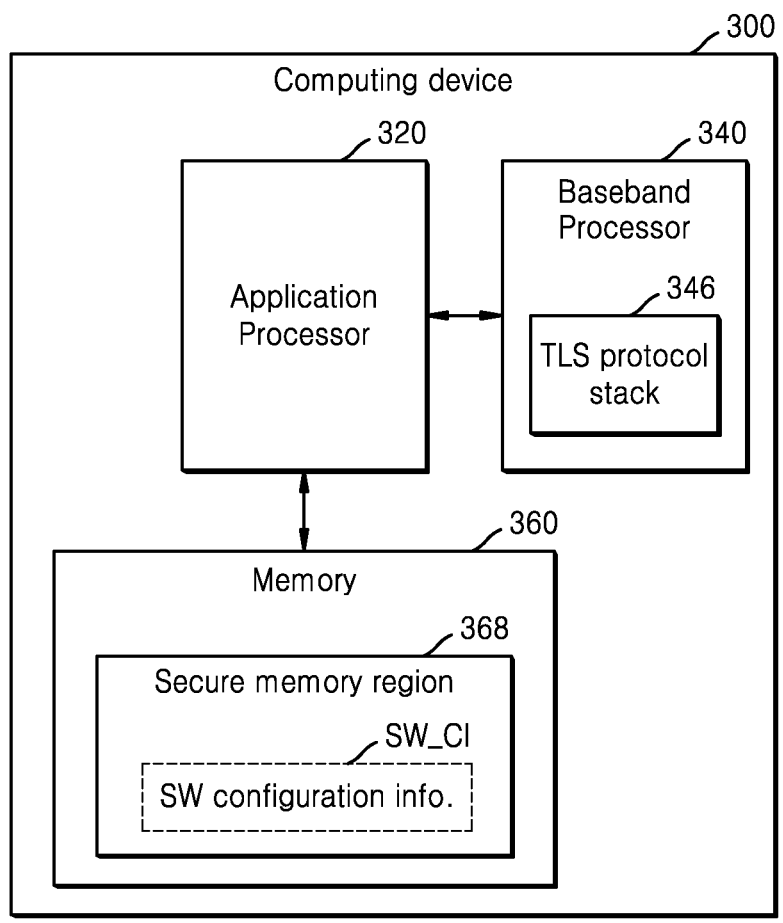
FIG. 7C is a block diagram of a client/server computing device for describing an example embodiment in which the integrity verification-related information is not included in a certificate but in a secure memory region.
Figure 7D:
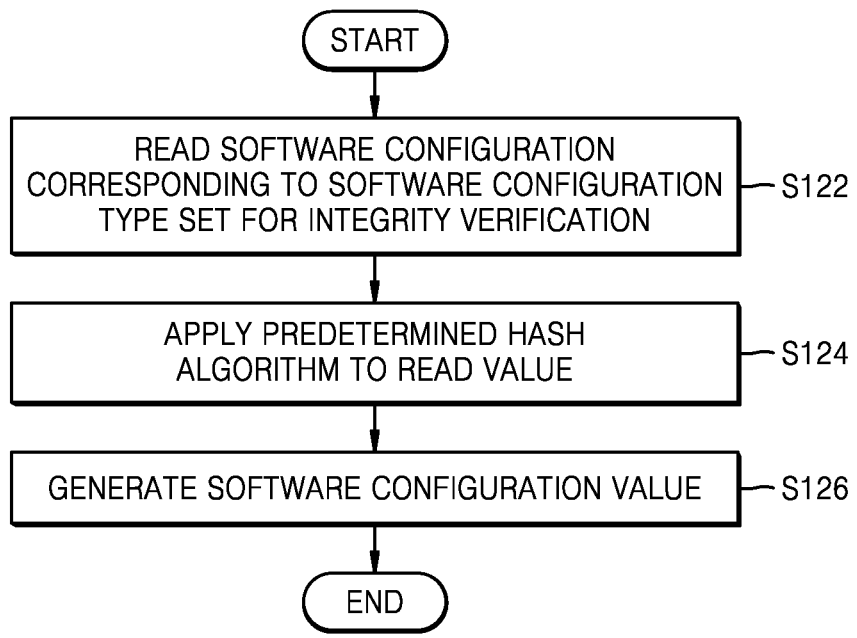
FIG. 7D is a flowchart of a method of generating a software configuration value, according to some example embodiments.

FIG. 7A is a block diagram for describing a certificate issuing method according to some example embodiments. FIG. 7B is a diagram for describing integrity verification-related information included in a certificate 30, according to some example embodiments. FIG. 7C is a block diagram of a client/server computing device 300 for describing an example embodiment in which integrity verification-related information is not included in a certificate but in a secure memory region 368. FIG. 7D is a flowchart of a method of generating a software configuration value, according to some example embodiments.

Referring to FIG. 7A, a client/server computing device 300 may provide a certificate signing request (CSR) to a certificate authority (CA) 380. According to an embodiment, the CSR may include software configuration type information of the client/server computing device 300, related to integrity verification, and a software configuration value corresponding to the software configuration type information. Hereinafter, the client/server computing device 300 means a client or a server. The CA 380 may provide a certificate to the client/server computing device 300 in response to the CSR. The certificate may include the software configuration type information of the client/server computing device 300 and the software configuration value corresponding to the software configuration type information, which are included in the CSR. That is, the certificate may include software configuration information of the client/server computing device 300 at the time when the client/server computing device 300 provides the CSR to the CA 380.

Referring to FIG. 7B, the certificate may include a first region 31a storing information about authenticated attributes, and a second region 31b storing CA signature information generated from the information about the authenticated attributes by using a predetermined (or desired) hash algorithm, a signature algorithm, and a private key of the CA 380.

The first region 31a may include an information region 32 storing a version number of the certificate, a serial number information region 33 storing a unique number assigned by the CA 380, a signature algorithm information region 34 storing information about an encryption algorithm such as a secure hash algorithm (SHA) or a digital signature algorithm (DSA) used for generating the CA signature information, a certificate issuer information region 35, a certificate validity indicator information region 36 storing information about certificate validity approval start time and end time, a certificate issuance target (or subject) identifier information region 37, a certificate issuance target (or subject) public key information region 38, and an extension region 39.

According to some example embodiments, the extension region 39 may store software configuration information SW_CI for the integrity verification of the client/server computing device 300. As described above, the software configuration information SW_CI may include software configuration type information 39a and a software configuration value 39b corresponding to the software configuration type information 39a.

Referring to FIG. 7C, the client/server computing device 300 may generate software configuration information SW_CI of the client/server computing device 300 (periodically or aperiodically) at the time when the client/server computing device 300 provides the CSR to the CA 380, and store the generated software configuration information SW_CI in a secure memory region 368 of the memory 360. The secure memory region 368 may be a region that is accessible only by an authorized user. That is, the client/server computing device 300 may perform integrity verification by using the certificate including the software configuration information SW_CI, as illustrated in FIG. 7B. When the software configuration information SW_CI is not included in the certificate, the client/server computing device 300 may separately store the software configuration information SW_CI in the secure memory region 368, read the software configuration information SW_CI from the secure memory region 368, and perform integrity verification using the read software configuration information SW_CI.

Referring to FIG. 7D, when the client/server computing device 300 provides the software configuration information SW_CI to the CA 380, or when the client/server computing device 300 stores the software configuration information SW_CI in the secure memory region 368, the client/server computing device 300 may generate the software configuration value included in the software configuration information SW_CI as follows. In operation S122, the client/server computing device 300 may read a software configuration corresponding to a software configuration type set for integrity verification. For example, when a process-map type is set as the software configuration type, the client/server computing device 300 may read information about a code region on a memory and information about system execution files. In operation S124, the client/server computing device 300 may optionally apply a predetermined (or desired) hash algorithm to the read value of the software configuration. In operation S126, the client/server computing device 300 may generate a software configuration value by using the read value.

Figure 8A:
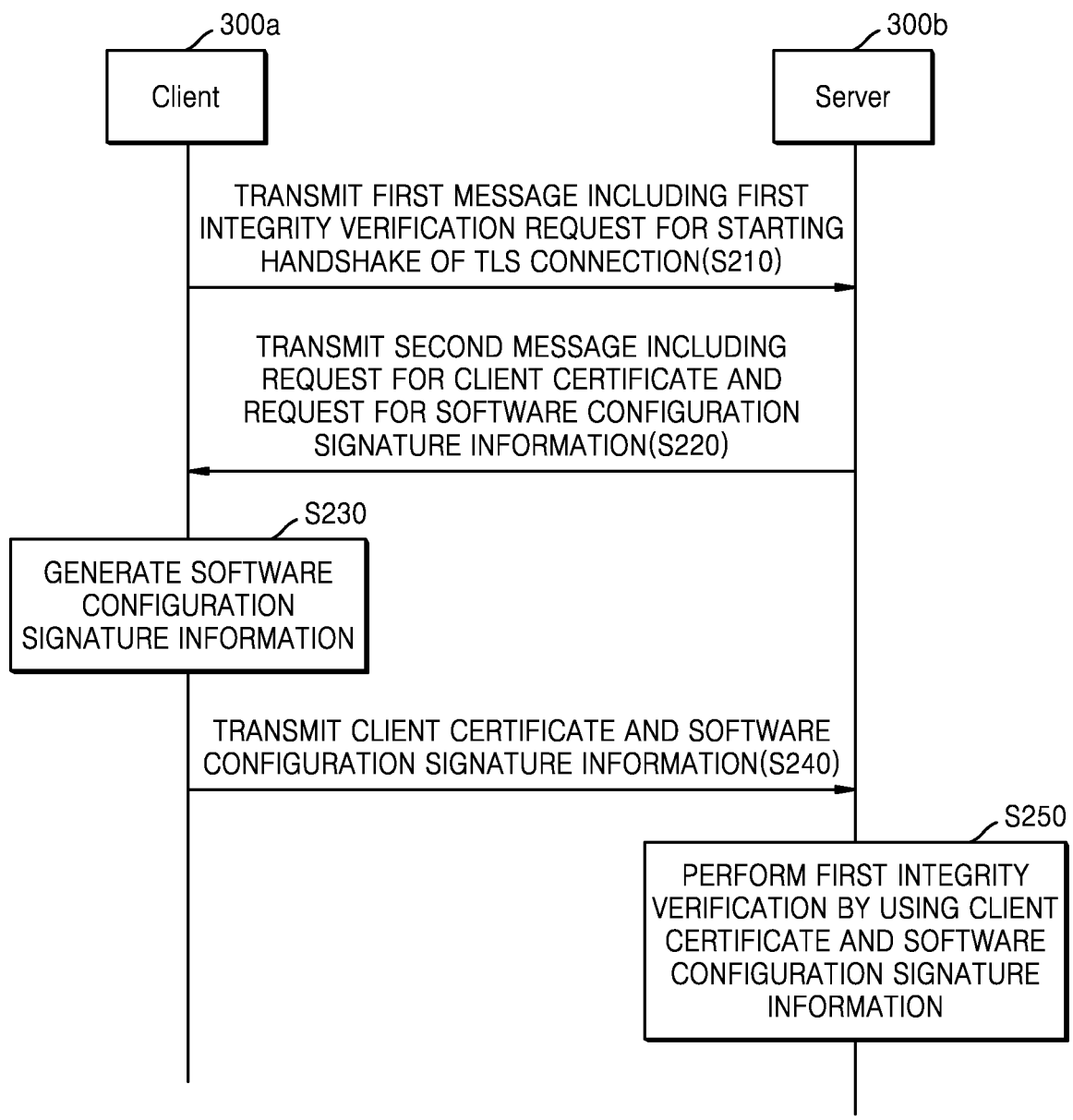
FIG. 8A is a flow diagram for describing a first integrity verification operation between a client and a server when software configuration information is included in a certificate, according to some example embodiments.
Figure 8B:
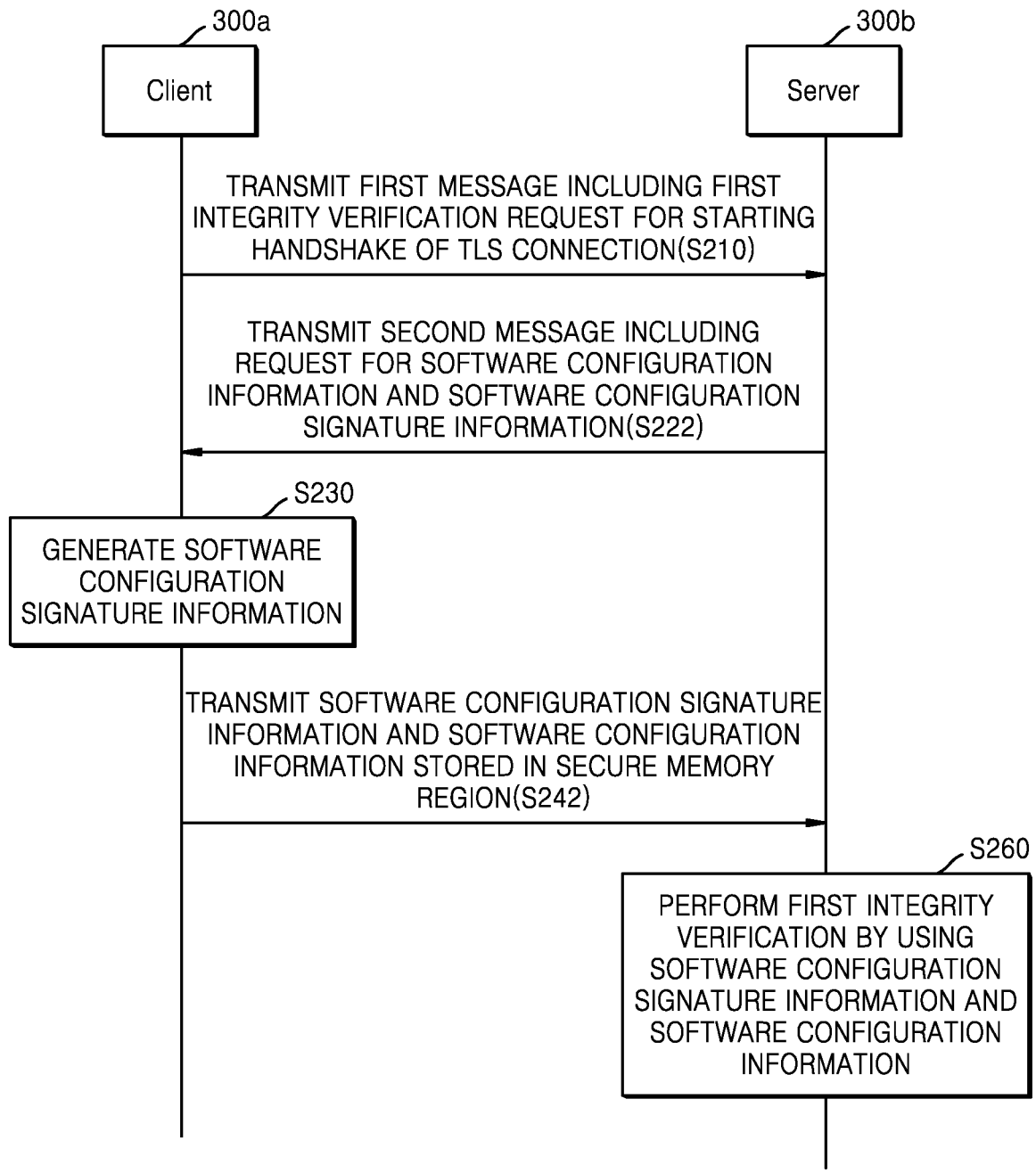
FIG. 8B is a flow diagram for describing a first integrity verification operation between a client and a server when software configuration information is included in a secure memory region of a memory of the client, according to some example embodiments.

FIG. 8A is a flow diagram for describing a first integrity verification operation between a client 300a and a server 300b when the software configuration information SW_CI is included in the certificate 30, according to some example embodiments. FIG. 8B is a flow diagram for describing a first integrity verification operation between a client 300a and a server 300b when the software configuration information SW_CI is included in the secure memory region 368 of the memory 360 of the client 300a, according to some example embodiments.

Referring to FIG. 8A, in operation S210, the client 300a may transmit, to the server 300b, a first message including the first integrity verification request for starting a handshake of TLS connection. The first integrity verification may mean integrity verification of the client 300a. In operation S220, the server 300b may transmit, to the client 300a, a second message including a request for a client certificate and a request for software configuration signature information for the first integrity verification. In operation S230, the client 300a may generate the software configuration signature information in response to the request for the software configuration signature information. In operation S240, the client 300a may transmit, to the server 300b, the client certificate and the software configuration signature information for the first integrity verification in the server 300b. In operation S250, the server 300b may perform the first integrity verification by using the client certificate and the software configuration signature information received from the client 300a.

Referring to FIG. 8B, in operation S210, the client 300a may transmit, to the server 300b, a first message including the first integrity verification request for starting a handshake of TLS connection. In operation S222, the server 300b may transmit, to the client 300a, a second message including a request for software configuration information and software configuration signature information for the first integrity verification. In operation S230, the client 300a may generate the software configuration signature information in response to the request for the software configuration signature information. In operation S242, the client 300a may read the software configuration signature information and the software configuration information stored in the secure memory region 368, for performing the first integrity verification in the server 300b, and transmit the software configuration signature information and the software configuration information to the server 300b.

Before reading the software configuration information stored in the secure memory region 368 and transmitting the read software configuration information to the server 300b, the client 300a may verify whether the software configuration information stored in the secure memory region 368 has been forged. According to some example embodiments, in storing the software configuration information in the secure memory region 368, the client 300a may also store security signature information in the secure memory region 368. The security signature information is information obtained by encrypting the software configuration information using a key, and means information for verifying whether the software configuration information stored in the secure memory region 368 has been forged. The client 300a reads the software configuration information and the security signature information stored in the secure memory region 368, decrypts the security signature information, and verifies whether the software configuration information has been forged by comparing the decrypted security signature information with the read software configuration information. The client 300a may transmit, to the server 300b, only the software configuration information verified as not forged. The operation of verifying whether the software configuration information stored in the secure memory region 368 of the client 300a has been forged is not limited to the client 300a, and may also be performed by the server 300b according to some other example embodiments. In operation S260, the server 300b may perform the first integrity verification by using the software configuration signature information and the software configuration information received from the client 300a.

Figure 9:
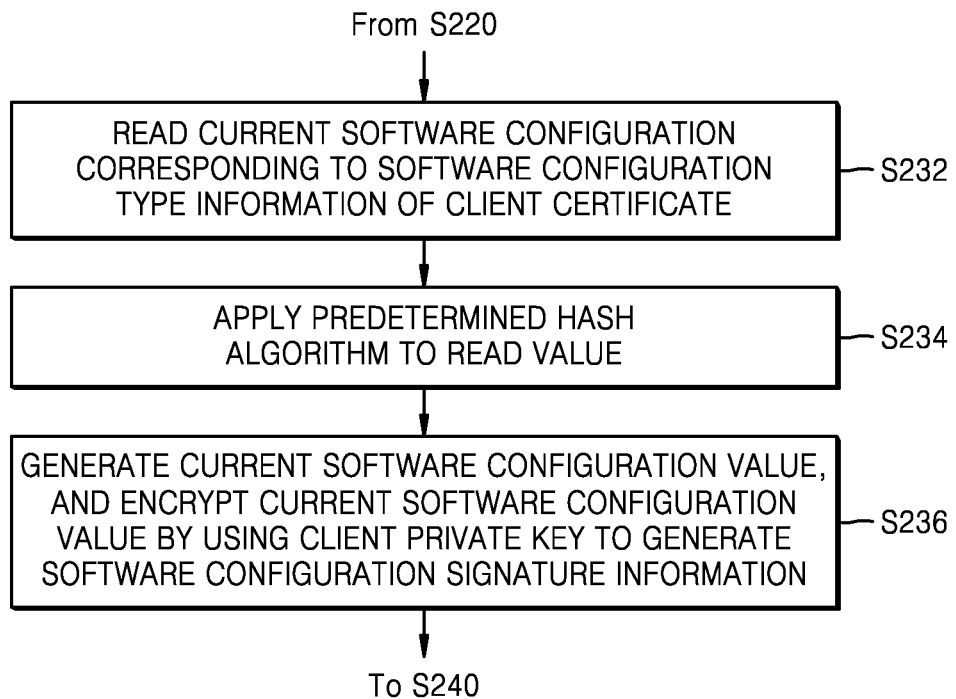
FIG. 9 is a flowchart of a method of generating software configuration signature information, according to some example embodiments.

FIG. 9 is a flowchart of a method of generating the software configuration signature information of FIG. 8A.

Referring to FIGS. 8A and 9, in operation S232 subsequent to operation S220, the client 300a may read, from the secure memory region 368 of the memory 360 of the client 300a, a current software configuration corresponding to the software configuration type information included in the client certificate. The current software configuration of the client 300a may indicate a software configuration state of the client 300a immediately before the server 300b performs the integrity verification on the client 300a. In operation S234, the client 300a may optionally apply a predetermined (or desired) hash algorithm to the read value of the current software configuration. In operation S236, the client 300a may generate a current software configuration value by using the read value, and encrypt the current software configuration value by using a private key of the client 300a to generate the software configuration signature information SW_CSI. The client 300a may generate the software configuration signature information SW_CSI in the secure execution environment therein (e.g., the TEE). Then, the process may proceed to operation S240. The description of operation S232 of FIG. 9 has focused on the operation in which the client 300a uses the software configuration type information of the client certificate by referring to the client certificate, but this is only a non-limiting example, and some example embodiments of the inventive concepts are not limited thereto. For example, the client 300a may access the secure memory region 368 and use the software configuration type information stored in the secure memory region 368, according to some other example embodiments.

Figure 10:
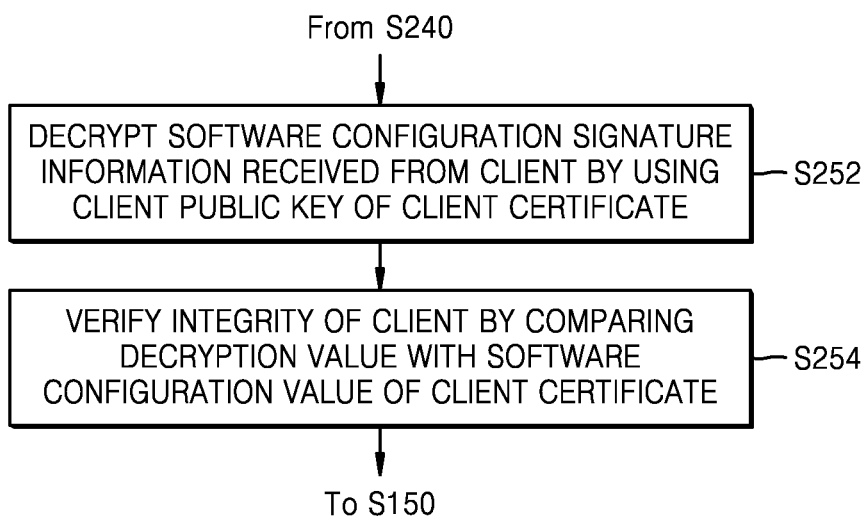
FIG. 10 is a flowchart of a first integrity verification operation S250 of FIG. 8A, according to some example embodiments.

FIG. 10 is a flowchart of the first integrity verification operation S250 of FIG. 8A, according to some example embodiments.

Referring to FIGS. 8A and 10, in operation S252 subsequent to operation S240, the server 300b may decrypt the software configuration signature information received from the client 300a by using the client public key of the client certificate. In operation S254, the server 300b may verify the integrity of the client 300a by comparing the decrypted software configuration signature information of the client 300a with the software configuration value of the client 300a included in the client certificate. For example, as a result of the comparing, when the decrypted software configuration signature information of the client 300a coincides with the software configuration value of the client 300a, the server 300b may confirm the integrity of the client 300a. Then, the process may proceed to operation S150 of FIG. 4.

Figure 11:
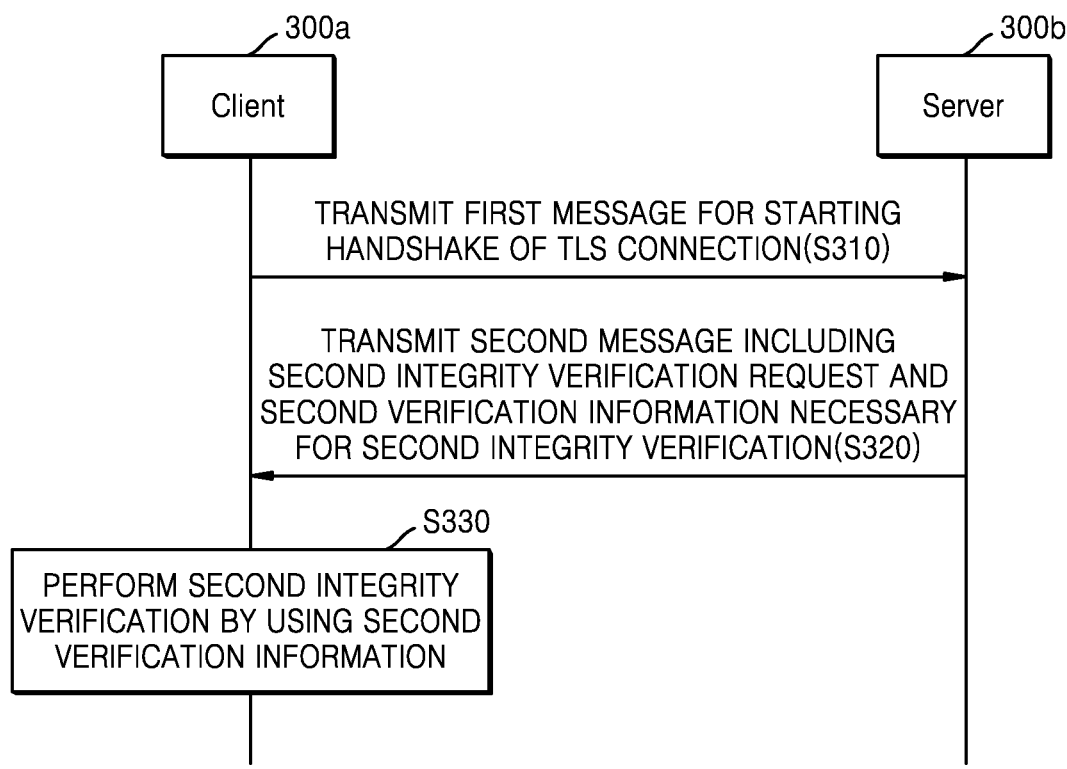
FIG. 11 is a flow diagram for describing a method of performing a second integrity verification, according to some example embodiments.

FIG. 11 is a flow diagram for describing a method of performing a second integrity verification, according to some example embodiments.

Referring to FIG. 11, in operation S310, the client 300a may transmit a first message for starting a handshake of a TLS connection. In operation S320, the server 300b may transmit, to the client 300a, a second message including a second integrity verification request and second verification information for the second integrity verification. The second integrity verification may mean integrity verification of the server 300b. According to some example embodiments, the server 300b may provide, to the client 300a, a server certificate and second verification information including software configuration signature information. As described above, the server certificate may include the software configuration information of the server 300b. According to some other example embodiments, the server 300b may provide, to the client 300a, second verification information including the software configuration information and the software configuration signature information of the server 300b, which are stored in the secure memory region 368 of the memory 360 of the server 300b. In operation S330, the client 300a may perform the second integrity verification of the server 300b by using the second verification information received from the server 300b.

The second verification information may be generated in the same manner as the first verification information of FIG. 4, and the second integrity verification may be performed in the same manner as the first integrity verification of FIG. 4, except that an integrity verification performer and a subject are changed. Details of the second integrity verification will be omitted.

Figure 12:
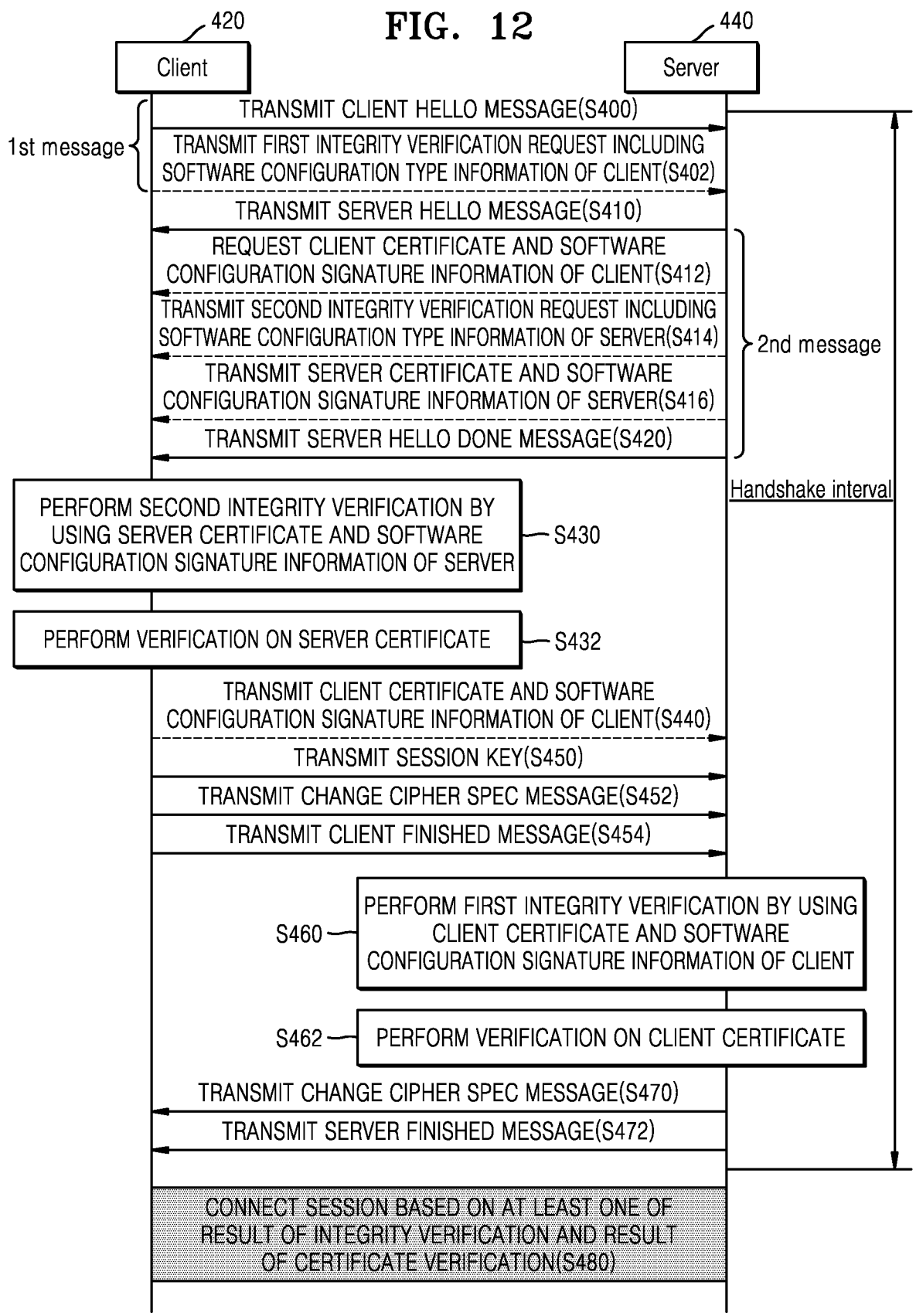
FIG. 12 is a flow diagram for describing a verification operation in a handshake interval between a client and a server, according to some example embodiments.

FIG. 12 is a flow diagram for describing a verification operation in a handshake interval between a client 420 and a server 440, according to some example embodiments.

The client 420 and the server 440 may perform the following handshake based on the handshake protocol PT1 of FIG. 1B so as to connect a session for secure data communication. Referring to FIG. 12, in operation S400, the client 420 may transmit a client hello message to the server 440 so as to start a TLS-based handshake. The client hello message may include at least one of TLS protocol version information of the client 420, ID field information of a session that has been connected to the server 440 in the past, first secure random data, a list of encryption algorithms supportable in the client 420, and a list of compression methods supportable in the client 420. In operation S402, the client 420 may transmit, to the server 440, a first integrity verification request including software configuration type information of the client 420. According to some example embodiments, the client 420 may transmit, to the server 440, the first integrity verification request including the software configuration type information SW_CT illustrated in FIG. 6B. For example, when the software configuration type information SW_CT included in the first integrity verification request is set as the non-configuration type (None), the server 440 may not perform the first integrity verification. When the software configuration type information SW_CT included in the first integrity verification request is set as one of the process-map type (Process_map), the security policy type (Security_policy), the process map-security policy type (Process_map & Security_policy), and the user-defined type (User_define), the server 440 may perform the first integrity verification by using a software configuration value of the client 420 corresponding to the set software configuration type. The client hello message and the first integrity verification request may be defined as being included in a first message that is transmitted to the server 440 by the client 420. Also, according to the IETF standard protocol, the operation in which the client 420 requests the first integrity verification may be optional, according to some example embodiments.

In operation S410, the server 440 may transmit a server hello message to the client 420 in response to the client hello message. The server hello message may include at least one of TLS protocol version information of the server 440, ID field information of a session that has been connected to the client 420 in the past, second secure random data generated by the server 440, an encryption algorithm selected from the list of encryption algorithms supportable in the client 420, and a compression method selected from the list of compression methods supportable in the client 420. In operation S412, the server 440 may request a client certificate and software configuration signature information of the client 420 from the client 420 in response to the client hello message or the first integrity verification request from the client 420. However, when it is unnecessary to perform the integrity verification on the client 420, the server 440 may request only the client certificate from the client 420 in operation S412, according to some other example embodiments. In operation S414, the server 440 may transmit, to the client 420, a second integrity verification request including software configuration type information of the server 440. According to some example embodiments, the server 440 may transmit, to the client 420, the second integrity verification request including the software configuration type information SW_CT illustrated in FIG. 6B. For example, when the software configuration type information SW_CT included in the second integrity verification request is set as the non-configuration type (None), the client 420 may not perform the second integrity verification. When the software configuration type information SW_CT included in the second integrity verification request is set as one of the process-map type (Process_map), the security policy type (Security_policy), the process map-security policy type (Process_map & Security_policy), and the user-defined type (User_define), the client 420 may perform the second integrity verification by using a software configuration value of the server 440 corresponding to the set software configuration type. In operation S416, the server 440 may transmit, to the client 420, a server certificate and software configuration signature information of the server 440, so that the client 420 performs the second integrity verification and/or the verification of the server certificate. However, when it is unnecessary to perform the integrity verification of the server 440, the server 440 may transmit only the server certificate to the client 420 in operation S416, according to some other example embodiments. In operation S420, the server 440 may provide, to the client 420, a server hello done message indicating that the message transmission in response to the client hello message has been completed. The server hello message, the request for the client certificate and the software configuration signature information of the client, the second integrity verification request, the server certificate, the software configuration signature information of the server 440, and the server hello done message may be defined as being included in a second message that is transmitted to the client 420 by the server 440. According to the IETF standard protocol, operations S412, S414, and S416 of the server 440 may be optional, according to some other example embodiments.

In operation S430, the client 420 may perform the second integrity verification by using the server certificate and the software configuration signature information of the server 440 in response to the second integrity verification request of operation S414. Specifically, the client 420 may perform the second integrity verification by using the software configuration signature information of the server 440 and the software configuration value included in the software configuration information of the server 440 in the server certificate. That is, the client 420 may decrypt the software configuration signature information of the server 440 by using a server public key included in the server certificate, and verify the integrity of the server 440 by comparing the decrypted software configuration signature information of the server 440 with the software configuration value of the server 440 included in the server certificate. For example, as a result of the comparing, when the decrypted software configuration signature information of the server 440 coincides with the software configuration value of the server 440 included in the server certificate, the client 420 may confirm the integrity of the server 440 (otherwise, the integrity of the server 440 is not confirmed).

Also, in operation S432, when the server certificate is received from the server 440, the client 420 may perform verification on the server certificate. According to some example embodiments, the client 420 may decrypt signature information of the server certificate by using a public key of a CA that has issued the server certificate, and verify the server certificate by comparing the decrypted signature information of the server certificate with authenticated attributes of the server certificate. For example, as a result of the comparing, when the decrypted signature information of the server certificate coincides with the authenticated attributes of the server certificate, the client 420 may verify that the server certificate is authentic (otherwise, the client 420 may determine that the server certificate has been forged).

However, although operations S430 and S432 are illustrated in FIG. 12 as being performed after operation S420, this is only a non-limiting example, and some example embodiments of the inventive concepts are not limited thereto. For example, operations S430 and S432 may be immediately performed when the second integrity verification can be performed, or when the verification of the server certificate can be performed, according to some other example embodiments. Furthermore, the order of operations S430 and S432 may be defined by the IETF standard protocol (or TLS).

In operation S440, the client 420 may transmit the client certificate and the software configuration signature information of the client 420 to the server 440. However, when it is unnecessary to perform the integrity verification on the client 420, the client 420 may transmit only the client certificate to the server 440 in operation S440, according to some other example embodiments. According to the IETF standard protocol, operation S440 of the client 420 may be optional according to some example embodiments.

In operation S450, the client 420 may generate a session key by using the first secure random data generated by the client 420 and the second secure random data generated by the server 440, and transmit the generated session key to the server 440. In operation S452, the client 420 may transmit, to the server 440, a change cipher spec message indicating that a message to be transmitted to the server 440 by using the session key is encrypted. In operation S454, the client 420 may transmit, to the server 440, a client finished message indicating that the message transmission for the handshake is finished.

In operation S460, the server 440 may perform the first integrity verification by using the client certificate and the software configuration signature information of the client 420 in response to the first integrity verification request of operation S402. Specifically, the server 440 may perform the first integrity verification by using the software configuration signature information of the client 420 and the software configuration value included in the software configuration information of the client 420 in the client certificate. That is, the server 440 may decrypt the software configuration signature information of the client 420 by using a client public key included in the client certificate, and verify the integrity of the client 420 by comparing the decrypted software configuration signature information of the client 420 with the software configuration value of the client 420 included in the client certificate. For example, as a result of the comparing, when the decrypted software configuration signature information of the client 420 coincides with the software configuration value of the client 420 included in the client certificate, the server 440 may confirm the integrity of the client 420 (otherwise, the integrity of the client 420 is not confirmed).

Also, in operation S462, when the client certificate is received from the client 420, the server 440 may perform verification on the client certificate. According to some example embodiments, the server 440 may decrypt signature information of the client certificate by using a public key of a CA that has issued the client certificate, and verify the client certificate by comparing the decrypted signature information of the client certificate with authenticated attributes of the client certificate. For example, as a result of the comparing, when the decrypted signature information of the client certificate coincides with the authenticated attributes of the client certificate, the server 440 may verify that the client certificate is authentic (otherwise, the server 440 may determine that the client certificate has been forged).

However, operations S460 and S462 are illustrated in FIG. 12 as being performed after operation S454, this is only a non-limiting example, and some example embodiments of the inventive concepts are not limited thereto. For example, operations S460 and S462 may be immediately performed when the first integrity verification can be performed, or when the verification of the client certificate can be performed, according to some other example embodiments. Furthermore, the order of operations S460 and S462 may be defined by the IETF standard protocol (or TLS).

In operation S470, the server 440 may transmit, to the client 420, a change cipher spec message indicating that a message to be transmitted to the client 420 by using the received session key is encrypted. In operation S472, the server 440 may transmit, to the client 420, a client finished message indicating that the message transmission for the handshake is finished.

In operation S480, the session between the client 420 and the server 440 may be connected based on at least one of a result of the integrity verification and a result of the certificate verification. According to some example embodiments, when the integrity of at least one of the client 420 and the server 440 is not confirmed, or when the certificate of at least one of the client 420 and the server 440 is determined to be forged, the session between the client 420 and the server 440 may not be connected.

As such, according to some example embodiments of the inventive concepts, the security of the data communication may be further improved through the integrity verification in the handshake interval between the client 420 and the server 440, as compared to the conventional client-server computing systems.

Figure 13:
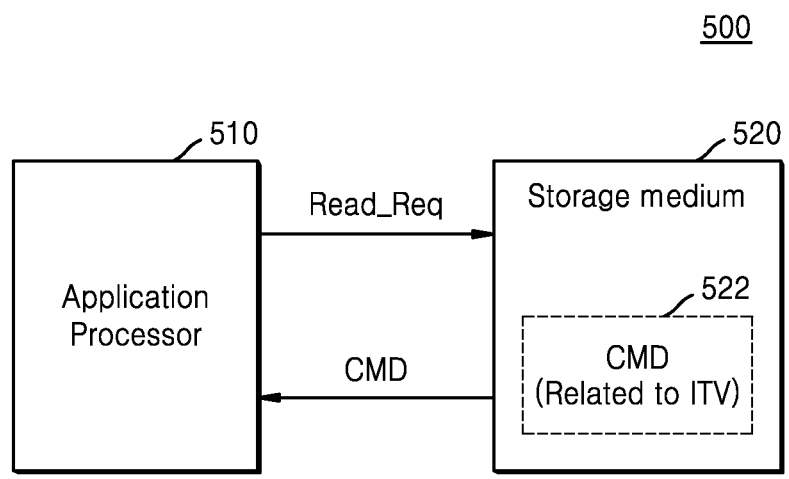
FIG. 13 is a block diagram of a storage medium storing commands that are a basis of an integrity verification operation, according to some example embodiments.

FIG. 13 is a block diagram of a storage medium storing commands that are a basis of an integrity verification operation, according to some example embodiments.

Referring to FIG. 13, a client/server computing device 500 may include an application processor 510 and a storage medium 520. The storage medium 520 may store pieces of non-transitory information that are readable by the application processor 510. The storage medium 520 may store commands that are executable by the application processor 510. According to some example embodiments, the storage medium 520 may include a region 522 storing commands for performing integrity verification in a handshake interval for the purpose of TLS connection. The application processor 510 included in the client computing device 500 may read the commands stored in the region 522 of the storage medium 520, receive a server certificate and software configuration signature information from the server computing device in the handshake interval of the TLS connection to the server computing device, and perform integrity verification of the server computing device by using the software configuration signature information, a public key included in the server certificate, software configuration type information of the server computing device, and a software configuration value of the server computing device.

Also, the application processor 510 included in the server computing device 500 may read the commands stored in the region 522 of the storage medium 520, receive a client certificate and software configuration signature information from the client computing device in the handshake interval of the TLS connection to the client computing device, and perform integrity verification of the client computing device by using the software configuration signature information, a public key included in the client certificate, software configuration type information of the client computing device, and a software configuration value of the client computing device.

Figure 14:
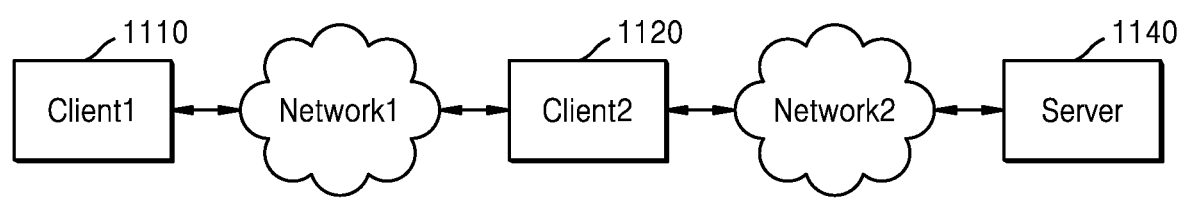
FIG. 14 is a block diagram of a first and second clients-server computing system, according to some example embodiments.

FIG. 14 is a block diagram for schematically explaining a first and second clients-server computing system 1100, according to some example embodiments.

Referring to FIG. 14, the first and second clients-server computing system 1100 may include a first client 1110, a second client 1120, and a server 1140. Each of the first client 1110 and the second client 1120 may correspond to the client 120 in FIG. 1, and the server 1140 may correspond to the server 140 in FIG. 1. Particularly, the first and second clients-server computing systems 1100 disclosed in FIG. 14 may illustrate a case where the first client 1110 is not capable of communicating directly with the server 1140. The cases where the first client 1110 is not capable of communicating directly with the server 1140 may vary. For example, when the first client 1110 does not support wireless fidelity (Wi-Fi) communication due to resource limitations while the server 1140 supports Wi-Fi communication, the first client 1110 may not be able to communicate directly with the server 1140. However, some example embodiments are not limited thereto. According to some other example embodiments, in a network system such as a mesh network, there may be the case where a first network Network1 between the first client 1110 and the second client 1120 is capable of being connected while a second network Network2 between the first client 1110 and the server 1140 is disconnected.

The first client 1110 may communicate with the second client 1120 via the first network Network1 and the second client 1120 may communicate with the server 1140 via the second network Network2. In the first and second clients-server computing system 1100 described above, the second client 1120 and the server 1140 may perform the server registration and integrity verification operations in the client-server computing system 100 described with reference to FIGS. 1 through 13. However, since the first client 1110 and the server 1140 cannot directly communicate with each other, the server registration method and the integrity verification method of the client-server computing system 100 described above with reference to FIGS. 1 through 13 may not be applicable for the first client 1110.

In this case, the second client 1120, which is connected to the first client 1110 via the first network Network1 and connected to the server 1140 via the second network Network2, may support the server registration and integrity verification operations on behalf of the first client 1110. This is described with reference to FIGS. 15 through 20.

Figure 15:
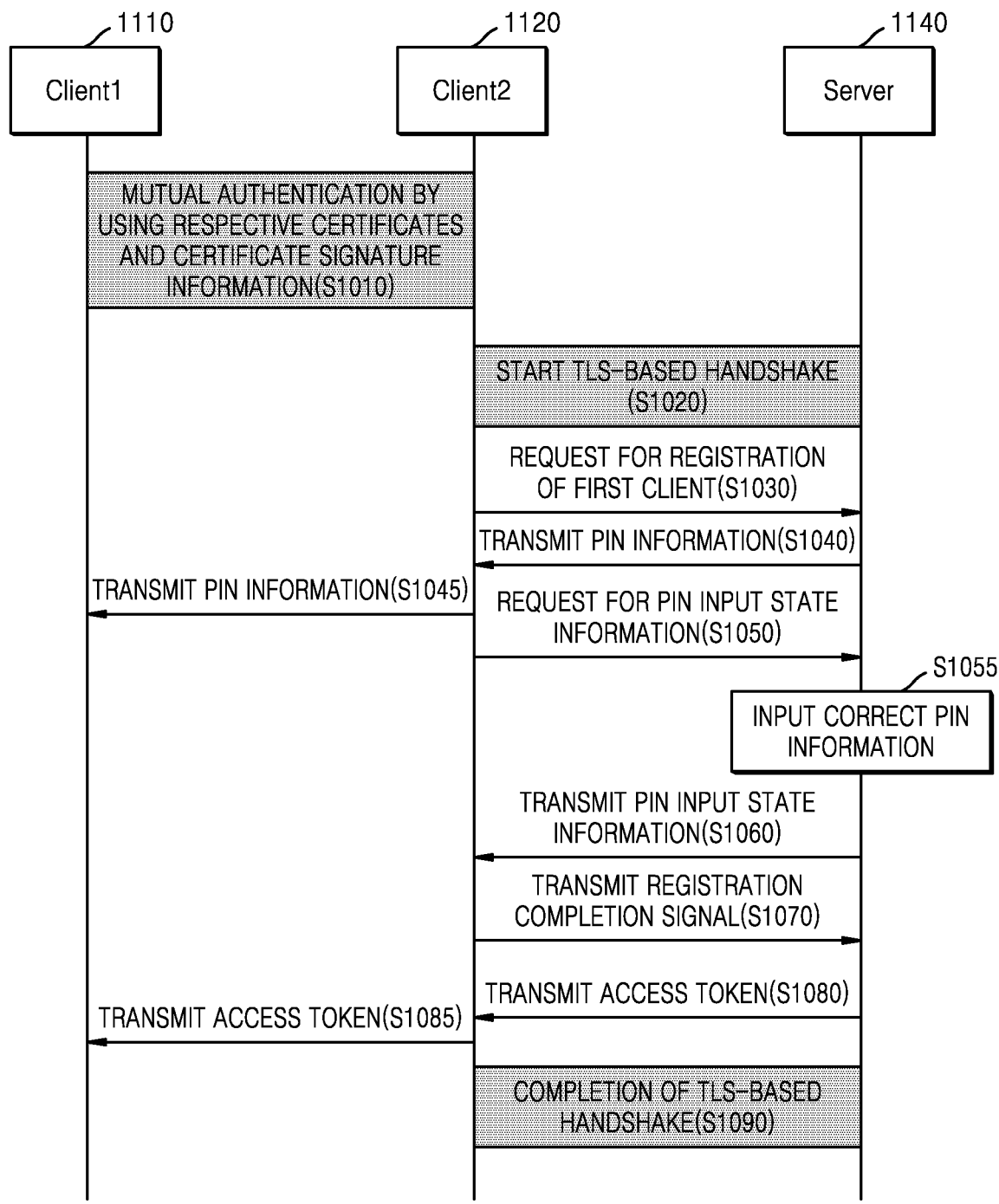
FIG. 15 is a flow diagram of operations of a first client-server computing system and a second client-server computing system performing server registration of a client, according to some example embodiments.

FIG. 15 is a flow diagram for explaining operations of the first and second clients-server computing system 1100 performing the server registration of the first client 1110, according to some example embodiments.

Referring to FIG. 15, before starting the TLS-based handshake, the first client 1110 and the second client 1120 may perform a mutual authentication operation by using respective certificates and signature information on the respective certificates (S1010). The mutual authentication operation may include an operation according to an authentication message verification protocol of the symmetric key method using an authentication key Key_Auth shared between the first client 1110 and the second client 1120. The symmetric key method using the authentication key Key_Auth will be described with reference to FIGS. 17A through 17D.

When the mutual authentication operation between the first client 1110 and the second client 1120 is normally completed, the second client 1120 and the server 1140 may start the TLS-based handshake (S1020). In other words, the second client 1120 and the server 1140 may start the handshake based on the handshake protocol of the TLS protocol stack.

The second client 1120 may transmit the registration request for the first client 1110 to the server 1140 so as to start the handshake of the TLS connection (S1030). The registration for the first client 1110 may indicate that the second client 1120 registers the first client 1110 in the server 1140 to enable the first client 1110 to gain access to the server 1140.

The server 1140 may transmit the PIN information to the second client 1120 in response to the registration request for the first client 1110 received from the second client 1120 (S1040). The server 1140 may verify whether the first client 1110 is authentic before transmitting the PIN information to the second client 1120, as described with reference to FIG. 16.

The second client 1120 may transmit the PIN information received from the server 1140 to the first client 1110 (S1045).

In addition, the second client 1120 may transmit the PIN authentication result information request to the server 1140 upon receiving the PIN information from the server 1140 (S1050). PIN authentication result information may be PIN input state information indicating whether the PIN information has been correctly input to the server 1140. For example, as the first client 1110 receives the PIN information from the second client 1120, the first client 1110 may transmit the PIN information to the user via the display device, including at least one of the visual display device and the auditory display device included in the first client 1110. The user may input the PIN information obtained via the display device to the server 1140. The second client 1120 may transmit the PIN authentication result information request to the server 1140 to verify whether the PIN information has been correctly input.

The PIN information may be input to the server 140 by the user (S1055). When the server 140 determines that correct PIN information is input, the server 1140 may transmit to the second client 1120 the PIN authentication result information (PIN input state information) indicating that the correct PIN information has been input (S1060). The second client 1120 may verify that the correct pin information has been input, by receiving the PIN authentication result information indicating that the correct PIN information has been input.

The second client 1120 may transmit the registration completion signal to the server 1140 in response to receiving the PIN authentication result information (S1070). The server 1140 may transmit to the second client 1120 an access token including a right to access the server 1140 by the first client 1110, upon receiving the registration completion signal from the second client 1120 (S1080). The second client 1120 may transmit the received access token to the first client 1110 (S1085). Thereafter, the first client 1110 may access the server 1140 by using the access token.

Then, the second client 1120 and the server 1140 may complete the TLS-based handshake (S1090).

According to the server registration method for the first client 1110 using the encryption security protocol-based communication according to some example embodiments, the first client 1110, which is not directly connectable to the server 1140 in the handshake interval, may be securely registered in the server 1140 via the second client 1120, in contrast to the conventional client-server computing systems.

Figure 16:
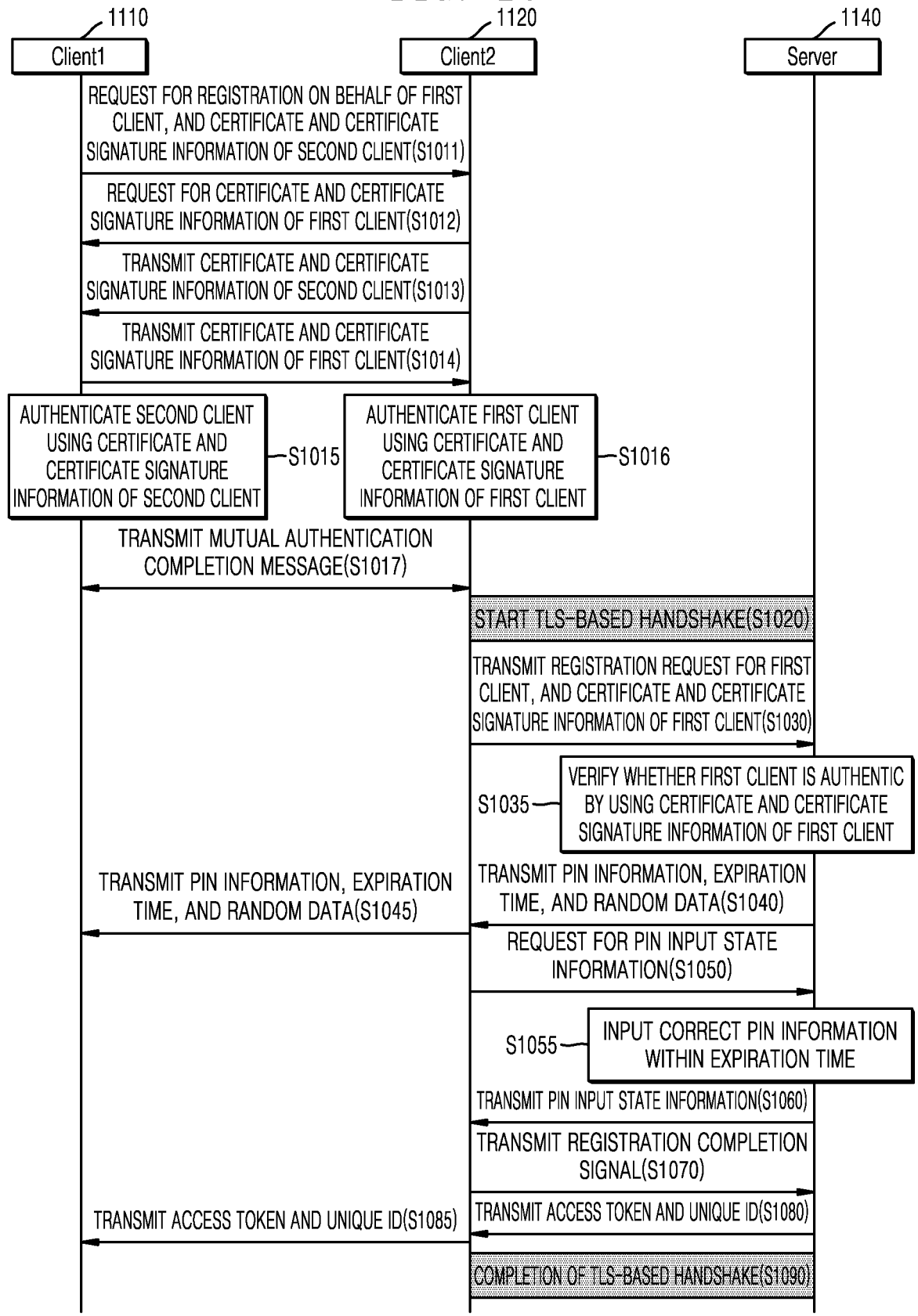
FIG. 16 is a flow diagram of operations of a first client-server computing system and a second client-server computing system which perform server registration of a client, according to some example embodiments.

FIG. 16 is a flow diagram for explaining operations of the first and second clients-server computing system 1100 performing the server registration of the first client 1110, according to some example embodiments.

Referring to FIG. 16, the first client 1110 may transmit the a request for registration with the server 1140 on behalf of the first client 1110 to the second client 1120, together with a request for the certificate and the certificate signature information of the second client 1120 to authenticate the second client 1120 (S1011). The second client 1120 may also transmit to the first client 1110 a request for the certificate and certificate signature information of the first client 1110 to authenticate the first client 1110 (S1012).

The second client 1120 may transmit the certificate and certificate signature information thereof to the first client 1110 in response to the request for the certificate and certificate signature information received from the first client 1110 (S1013). The second client 1120 may generate the certificate signature information by encrypting authenticated attributes included in the certificate thereof by using the private key thereof.

The first client 1110 may transmit the certificate and certificate signature information of the first client 1110 to the second client 1120 in response to the request for the certificate and certificate signature information received from the second client 1120 (S1014). The first client 1110 may generate the certificate signature information by encrypting information about authenticated attributes included in the certificate thereof by using the private key thereof. In addition, the first client 1110 may transmit the generated certificate signature information thereof to the second client 1120 together with the authentication message generated according to the authentication message generation protocol of the symmetric key method by using the certificate and the certificate signature information of the first client 1110.

The first client 1110 may authenticate the second client 1120 by using the certificate and the certificate signature information of the second client 1120 (S1015). For example, the first client 1110 may decrypt the certificate signature information by using the public key of the second client 1120, and verify the certificate of the second client 1120 by comparing the decrypted certificate signature information of the second client 1120 with information about the authenticated attributes of the certificate of the second client 1120. When the certificate of the second client 1120 has been verified, the first client 1110 may determine that the second client 1120 has been verified.

The second client 1120 may authenticate the first client 1110 by using the certificate and the certificate signature information of the first client 1110. For example, the second client 1120 may verify the certificate and the certificate signature information of the first client 1110, received together with the authentication message, by using the authentication message verification protocol of the symmetric key method using the authentication key. Thereafter, the second client 1120 may decrypt the certificate signature information by using the public key of the first client 1110 included in the certificate of the first client 1110, and may verify the certificate of the first client 1110 by comparing the decrypted certificate signature information of the first client 1110 with information about the authenticated attributes of the certificate of the first client 1110. When both the authentication message and the certificate of the first client 1110 are verified, the second client 1120 may determine that the first client 1110 has been verified.

Thereafter, each of the first client 1110 and the second client 1120 may transmit an authentication completion message indicating completion of the mutual authentication operation between the first client 1110 and the second client 1120 (S1017).

When the mutual authentication operation between the first client 1110 and the second client 1120 is normally completed, the second client 1120 and the server 1140 may start the TLS-based handshake (S1020). In other words, the second client 1120 and the server 1140 may start the handshake based on the handshake protocol of the TLS protocol stack.

The second client 1120 may transmit the registration request for the first client 1110 to the server 1140 to start the handshake of the TLS connection, together with the certificate and the certificate signature information of the first client 1110 (S1030).

The server 1140 may verify whether the first client 1110 is authentic by using the certificate and the certificate signature information of the first client 1110 (S1035). For example, the server 1140 may decrypt the certificate signature information of the first client 1110 by using the public key of the certification authority that has issued the certificate of the first client 1110, and may verify the certificate of the first client 1110 by comparing the decrypted certificate signature information of the first client 1110 with the information about the authenticated attributes of the certificate of the first client 1110. When the certificate of the first client 1110 is verified, the server 1140 may determine that the first client 1110 is authentic.

The server 1140 may transmit the PIN information, together with the PIN information expiration time, to the second client 1120. The server 1140 may also transmit random data to the second client 1120, for further security enhancement.

The second client 1120 may transmit to the first client 1110 the PIN information, the PIN information expiration time, and the random data that are received from the server 1140 (S1045).

In addition, the second client 1120 may transmit the PIN authentication result information request to the server 1140 upon receiving the PIN information from the server 1140 and/or upon transmitting the PIN information, the PIN information expiration time, and the random data to the first client 1110 (S1050). The PIN authentication result information may be PIN input state information indicating whether the PIN information has been correctly input to the server 1140 within the PIN information expiration time.

The PIN information may be input to the server 1140 by the user (S1055). When the server 1140 determines that the correct PIN information is input within the PIN information expiration time, the server 1140 may transmit to the second client 1120 the PIN authentication result information (PIN input state information) indicating that the correct PIN information has been input (S1060). The second client 1120 may verify that the correct pin information has been input, by receiving the PIN authentication result information indicating that the correct PIN information has been input.

The second client 1120 may transmit the registration completion signal to the server 1140 in response to receiving the PIN authentication result information (S1070). The server 1140 may transmit to the second client 1120 the access token including the right to access the server 1140 by the first client 1110 upon receiving the registration completion signal from the second client 1120, together with the unique identifier Unique ID to identify the first client 1110 (S1080). The second client 1120 may transmit the received access token and the unique identifier Unique ID to the first client 1110 (S1085). Thereafter, the first client 1110 may access the server 1140 by using the access token and the unique identifier Unique ID.

Then, the second client 1120 and the server 1140 may complete the TLS-based handshake (S1090).

According to the server registration method for the first client 1110 using the encryption security protocol-based communication according to some example embodiments, the first client 1110, which is not directly connectable to the server 1140 in the handshake interval, may be securely registered in the server 1140 via the second client 1120, in contrast to the conventional client-server computing systems.

Figure 17A:
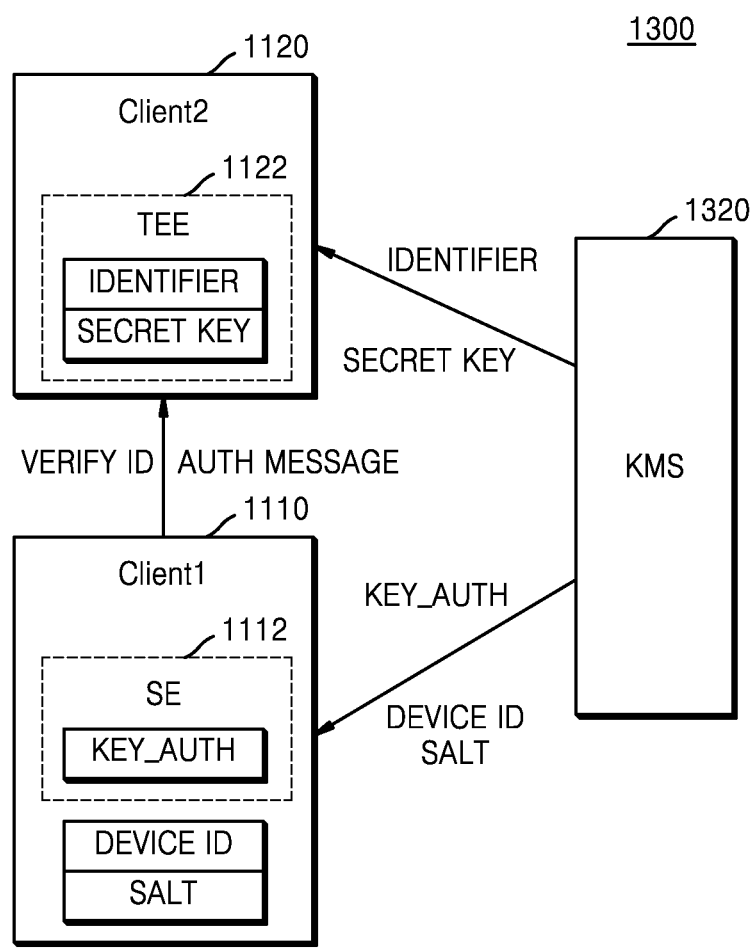
FIG. 17A illustrates a network authentication system for explaining a symmetric key method using an authentication key, according to some example embodiments.

FIG. 17A illustrates a network authentication system 1300 for explaining a symmetric key method using the authentication key, according to some example embodiments.

Referring to FIG. 17A, the network authentication system 1300 may include the first client 1110, the second client 1120, and a key management system (KMS) 1320. The second client 1120 may be referred to as a hub device and the first client 1110 may be referred to as an end-node device. However, this is only a non-limiting example for convenience of description, and the network authentication system 1300 may include a plurality of end-node devices (clients).

The KMS 1320 may generate a salt, a device identification DEVICE ID, an identifier IDENTIFIER, and a secret key SECRET KEY of the first client 1110. In addition, the KMS 1320 may generate the authentication key KEY_AUTH of the first client 1110 by using the salt, the device identification DEVICE ID, the identifier IDENTIFIER, and the secret key SECRET KEY. Generation of the authentication key KEY_AUTH may be performed according to the authentication key generation protocol illustrated in FIG. 17B. The salt may be data having a certain bit number arbitrarily generated by the KMS 1320. The KMS 1320 may transmit the identifier IDENTIFIER and the secret key SECRET KEY to the second client 1120, and may transmit the salt, the device identification DEVICE ID, and the secret key SECRET KEY to the first client 1110. Thus, in some example embodiments, the authentication key KEY_AUTH may be stored in the first client 1110 in advance.

The second client 1120 may include a trusted execution environment (TEE) 1122. The TEE 1122 is a secure area that may reside in an application processor (not illustrated) of the second client 1120, for example. The TEE 1122 is a hardware architecture combined with dedicated software that forms the basis of trust for a wide variety of applications, and provides functionality related to device integrity, key management, cryptographic operations, authentication, authorization, access control, and privacy protection. The TEE 1122 is separated by hardware from a main operating system (OS) of the second client 1120, and ensures the secure storage and processing of sensitive data and trusted applications. The TEE 1122 may protect the integrity and confidentiality of key resources, and manage and execute trusted applications, for example. Trusted applications running in the TEE 1122 have access to the main processor (CPU) and memory (not illustrated), while hardware isolation protects these trusted applications from other applications (e.g., untrusted applications, user-installed applications) running in the main OS. Software and cryptographic isolation inside the TEE 1122 protect the trusted applications contained within from each other.

The TEE 1122 may include a security area where an access to the second client 1120 from the outside is impossible. The second client 1120 may store information related to security in the TEE 1122. For example, the TEE 1122 may store the identifier IDENTIFIER and the secret key SECRET KEY received from the KMS 1320. Since the TEE 1122 is not accessible from the outside, an external intruder such as malware cannot access the identifier IDENTIFIER and the secret key SECRET KEY.

The first client 1110 may include a security element (SE) 1112, such as in the form of an embedded, tamper-resistant security chip, a secure integrated circuit (IC), an application specific integrated circuit (ASIC), a hardware security module (HSM), etc. Dedicated software for the SE 1112 supports various tasks such as personal verification, device authentication, security key and sensitive data storage, cryptographic operations, encoding and decoding, etc., and allows key and authentication information to be safely transferred between devices, servers, and clouds, for example. The SE 1112 may store the authentication key KEY_AUTH received from the KMS 1320. Since the SE 1112 is an area with enhanced security in the first client 1110, the authentication key KEY_AUTH is not accessible from the outside. The first client 1110 may store the device identification DEVICE ID and the salt separately from the authentication key KEY_AUTH (e.g., in a memory separate from the SE 1112), according to some example embodiments.

The first client 1110 may transmit verification identification VERIFY ID to the second client 1120 and may transmit the authentication message AUTH MESSAGE for authentication of the first client 1110 to the second client 1120. The first client 1110 may generate the authentication message AUTH MESSAGE by using the device identification DEVICE ID, the salt, the authentication key KEY_AUTH, and the verification information VERIFY ID. Generation of the authentication message AUTH MESSAGE by the first client 1110 may be performed according to the authentication message generation protocol described with reference to FIG. 17C.

The second client 1120 may receive the authentication message AUTH MESSAGE for authentication of the first client 1110. The second client 1120 may authenticate the first client 1110 by using the previously received verification identification VERIFY ID and authentication message AUTH MESSAGE. Authentication for the first client 1110 may be performed according to the authentication message verification protocol described with reference to FIG. 17D.

Figure 17B:
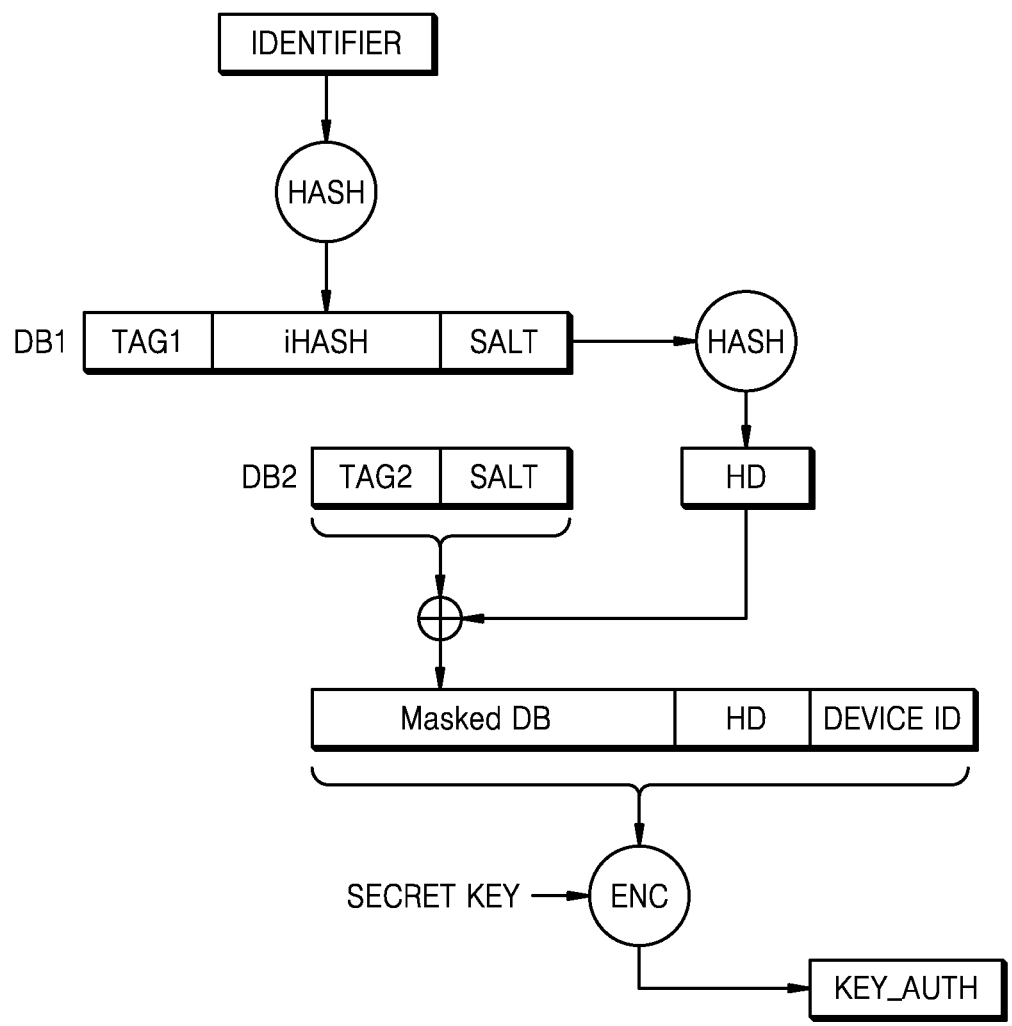
FIG. 17B illustrates an authentication key generation protocol for explaining a symmetric key method using an authentication key, according to some example embodiments.

FIG. 17B illustrates the authentication key KEY_AUTH generation protocol for explaining the symmetric key method using the authentication key KEY_AUTH according to some example embodiments.

Generation of the authentication key KEY_AUTH may be performed by the second client 1120 and the KMS 1320 in FIG. 17A. Hereinafter, for convenience of description, it is assumed that the authentication key generation protocol in FIG. 17B is performed by the second client 1120. A process of generating the authentication key KEY_AUTH by the KMS 1320 may also be understood to be the same as the process of generating the authentication key KEY_AUTH described below.

Referring to FIG. 17B, the second client 1120 may generate an iHASH from the identifier IDENTIFIER by using a hash function HASH. The second client 1120 may generate a first data block DB1 by using a first tag TAG1, the iHASH, and the salt SALT. The second client 1120 may generate a second data block DB2 by using a second tag TAG2 and the salt SALT, and generate a hashed data block HD from the first data block DB1 by using the hash function HASH. The first tag TAG1 and the second tag TAG2 may include arbitrary data having a certain number of bits. The second client 1120 may generate a masked data block Masked DB from the second data block DB2 and the hash data block HD by using an XOR operation. The second client 1120 may generate the authentication key KEY_AUTH from a message including the masked data block Masked DB, the hashed data block HD, and the device identifier DEVICE ID by using an encryption operation ENC. The encryption operation ENC may be performed by using the secret key SECRET KEY stored in the TEE 1122 of the second client 1120.

Accordingly, the second client 1120 in FIG. 17A may generate the authentication key KEY_AUTH by using the salt SALT and the device identifier DEVICE ID included in the authentication message AUTH MESSAGE received from the first client 1110, and the stored identifier IDENTIFIER and secret key SECRET KEY. The KMS 1320 may also generate the authentication key KEY_AUTH by using the salt SALT, the device identifier DEVICE ID, the identifier IDENTIFIER, and the secret key SECRET KEY. Regarding the method of generating the authentication message KEY_MESSAGE illustrated in FIG. 17B, a method of configuring data blocks by using various data is not limited to an order illustrated in FIG. 17B, and the order of data in the configuring data blocks may be changed according to some other example embodiments.

Figure 17C:
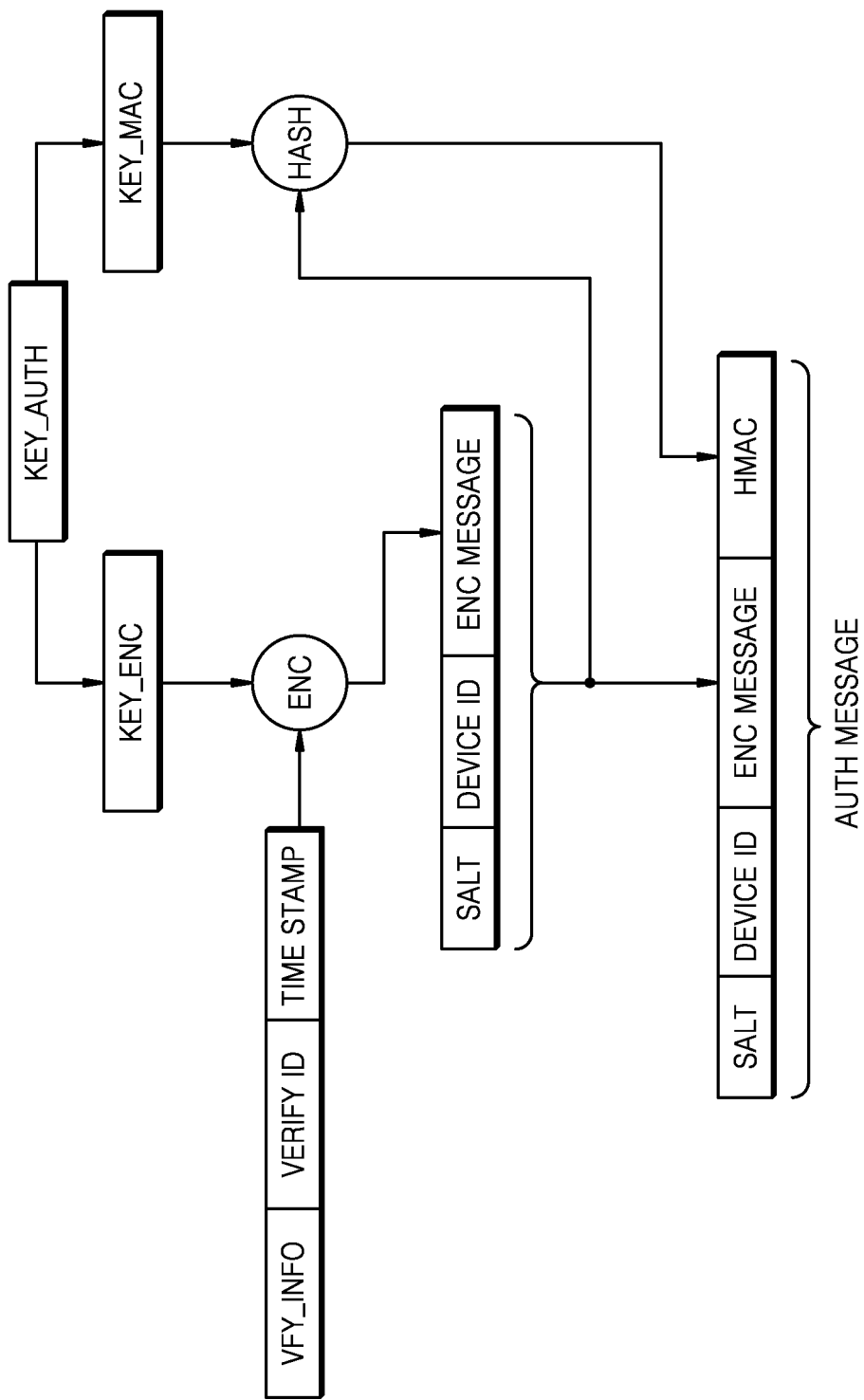
FIG. 17C illustrates an authentication message generation protocol for explaining a symmetric key method using an authentication key, according to some example embodiments.

FIG. 17C illustrates the authentication message AUTH MESSAGE generation protocol for explaining the symmetric key method using the authentication key KEY_AUTH according to some example embodiments.

Generation of the authentication message AUTH MESSAGE may be performed by the first client 1110 in FIG. 17A.

Referring to FIG. 17C, the first client 1110 may receive the authentication key KEY_AUTH from the KMS 1320 in advance and store the received authentication key KEY_AUTH in the SE 1112 (e.g., the security chip) of the first client 1110. The authentication key KEY_AUTH may include an encryption key KEY_ENC and a message authentication code (MAC) key KEY_MAC. The first client 1110 may perform an encryption operation ENC of the symmetric key method by using the encryption key KEY_ENC based on the verification ID VERIFY ID, a time stamp TIME STAMP, and the verification information VFY_INFO to generate an encrypted message ENC MESSAGE. The verification information VFY_INFO may include various pieces of verification information to be used for authentication of the first client 1110. The first client 1110 may perform a hash operation HASH by using the MAC key KEY_MAC based on the salt SALT, the device identifier DEVICE ID, and the encrypted message ENC MESSAGE, thereby generating a hashed MAC HMAC. The first client 1110 may generate the authentication message AUTH MESSAGE by using the salt SALT, the device identifier DEVICE ID, the encryption message ENC MESSAGE, and the hashed MAC HMAC.

Accordingly, the first client 1110 in FIG. 17A may generate the authentication message AUTH MESSAGE by using the salt SALT, the device identifier DEVICE ID, the authentication key KEY_AUTH, and the verification information VFY_INFO. Regarding the method of generating the authentication message AUTH MESSAGE shown in FIG. 17C, the method of configuring data blocks by using various data is not limited to an order illustrated in FIG. 17C, and the order of data in the configuring data blocks may be changed according to some other example embodiments.

Figure 17D:
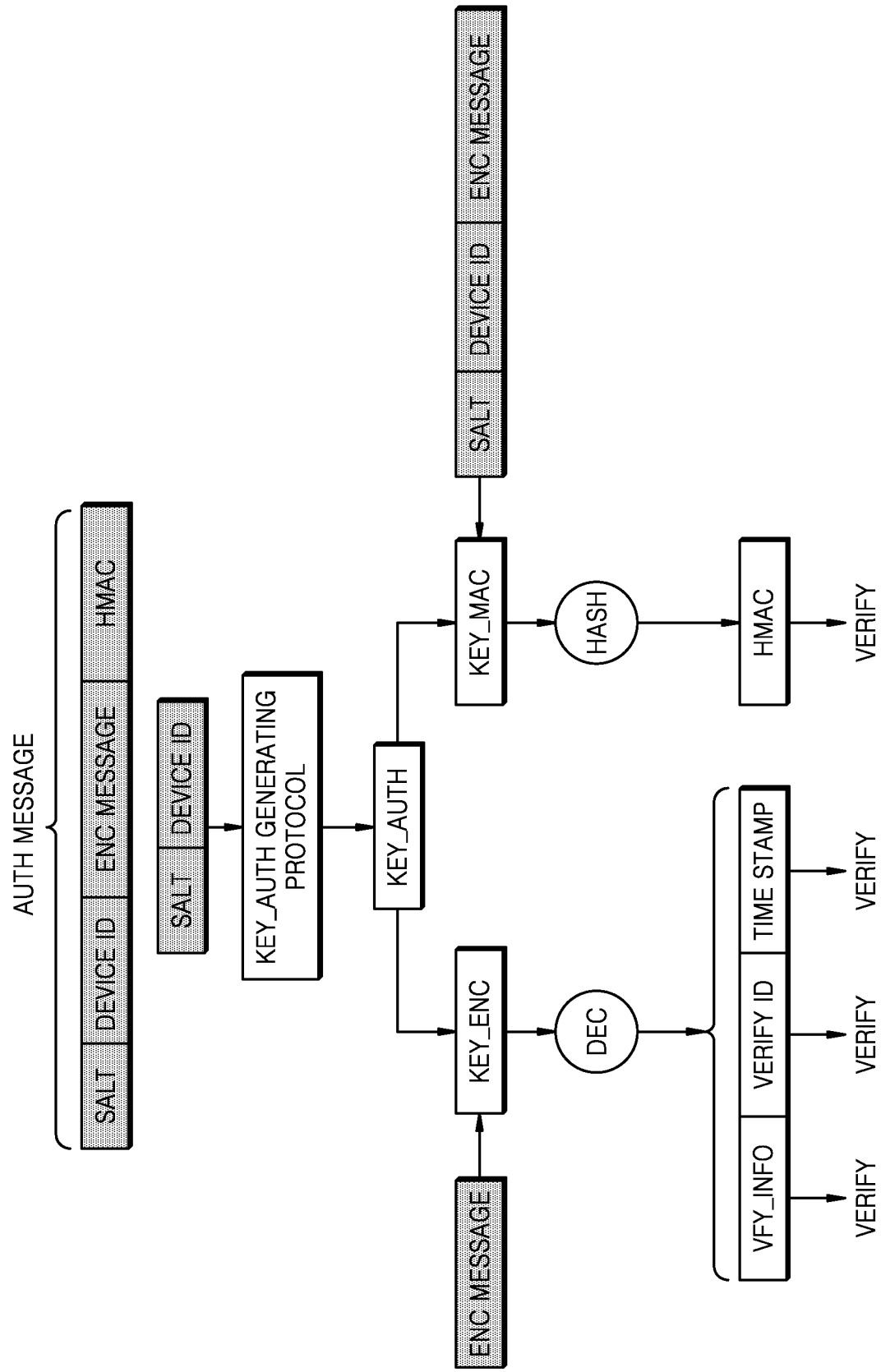
FIG. 17D illustrates an authentication message verification protocol for explaining a symmetric key method using an authentication key, according to some example embodiments.

FIG. 17D illustrates the authentication message verification protocol for explaining the symmetric key method using the authentication key KEY_AUTH, according to some example embodiments.

Verification of the authentication message AUTH MESSAGE may be performed by the second client 1120 in FIG. 17A. For convenience of description, shaded data blocks in FIG. 17D may represent received data, and un-shaded data blocks may represent internally-generated data.

Referring to FIG. 17D, the second client 1120 may generate the authentication key KEY_AUTH according to the authentication key KEY_AUTH generation protocol in FIG. 17B by using the salt SALT and the device identifier DEVICE ID included in the received authentication message AUTH MESSAGE. The authentication key KEY_AUTH may include the encryption key KEY_ENC and the MAC key KEY_MAC.

The second client 1120 may decrypt the encrypted message ENC MESSAGE included in the received authentication message AUTH MESSAGE by using the encryption key KEY_ENC and the decryption operation DEC of the symmetric key method, thereby obtaining the verification identifier VERIFY ID, the time stamp TIME STAMP, and the verification information VFY_INFO. The second client 1120 may compare the obtained information with the verification identification VERIFY ID, the time stamp TIME STAMP, and the verification information VFY_INFO that are separately received, thereby performing the verification operation on these pieces of information.

The second client 1120 may generate the hashed MAC HMAC by performing the hash operation HASH by using the MAC key KEY_MAC on the salt SALT, the device information DEVICE ID, and the encrypted message ENC MESSAGE included in the received authentication message AUTH MESSAGE. The second client 1120 may perform the verification operation on the hashed MAC HMAC by comparing the generated hashed MAC HMAC with the received hashed MAC HMAC.

When all of the verification identifier VERIFY ID, the time stamp TIME STAMP, the verification information VFY_INFO, and the hashed MAC HMAC are verified by the second client 1120, the authentication operation has been normally completed.

The authentication message verification protocol by the second client 1120 may be used for performing the device authentication of the first client 1110, and may also be used for performing the integrity verification operation on the verification information received from the first client 1110. As described above, performing the integrity verification operation on the verification information of the first client 1110 by the second client 1120 according to the authentication message verification protocol may be referred to as an inter-client integrity verification operation.

According to the symmetric key method using the authentication key KEY_AUTH disclosed with reference to FIGS. 17A through 17D, the first client 1110 and the second client 1120 may indirectly share the authentication key KEY_AUTH without a direct sharing of the symmetric key, and the decryption operation according to the symmetric key method may perform the device authentication and/or the integrity verification operation with only a small amount of resources because the decryption operation of the symmetric key method needs less amount of computations than other decryption operations (e.g., as compared to decryption operations of an asymmetric key method). In addition, because the authentication key KEY_AUTH used as the symmetric key is indirectly shared between the devices and is not directly shared, a risk that the symmetric key is exposed to outside attackers may be reduced or prevented, in contrast to the conventional client-server computing systems.

Figure 18:
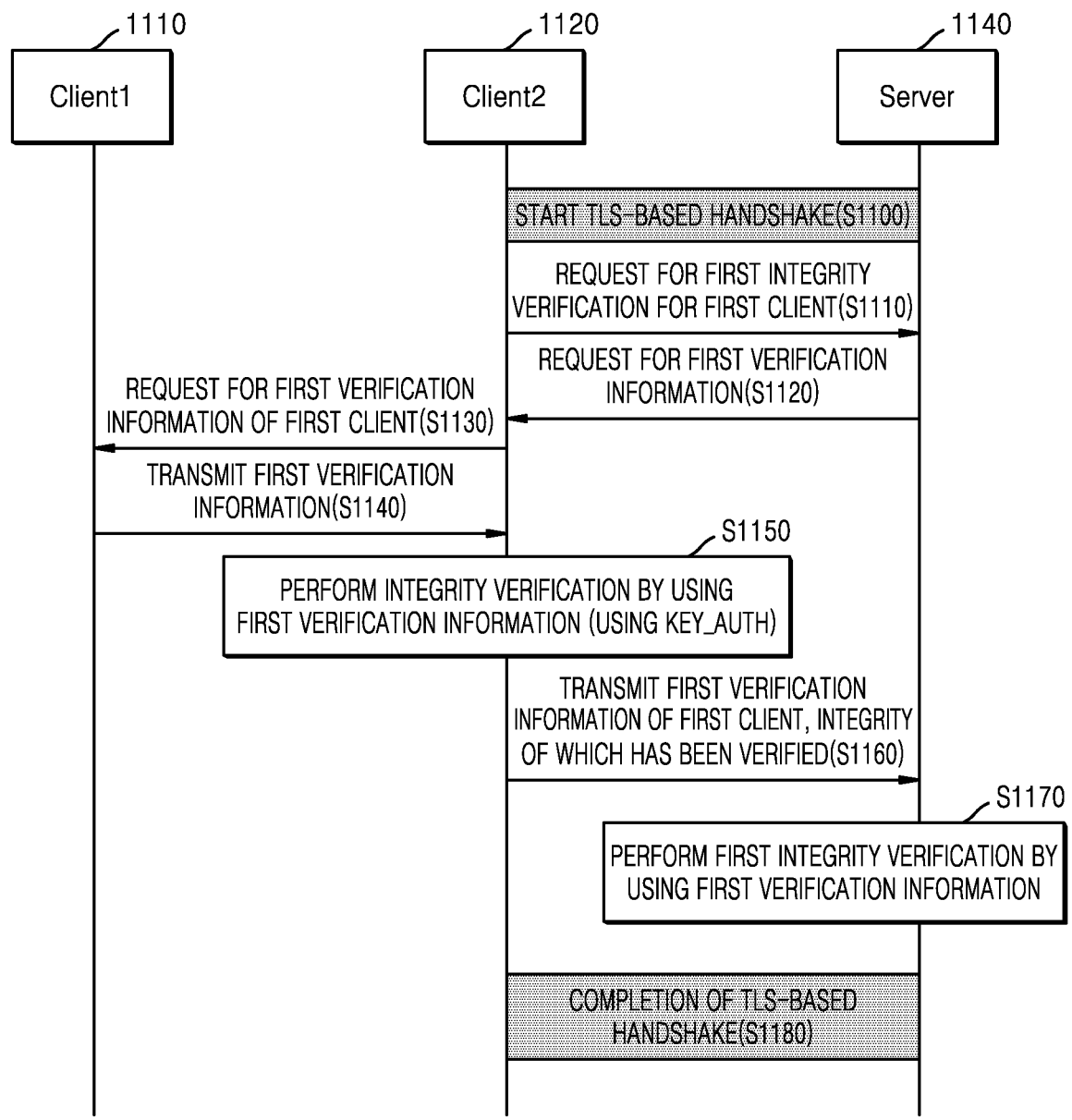
FIG. 18 is a flow diagram of operations of a first client-server computing system and a second client-server computing system which perform integrity verification of a first client, according to some example embodiments.

FIG. 18 is a flow diagram for explaining operations of the first and second clients-server computing system 1100 performing the integrity verification of the first client 1110, according to some example embodiments.

Referring to FIG. 18, the second client 1120 and the server 1140 may start the TLS-based handshake (S1100). In other words, the second client 1120 and the server 1140 may start the handshake based on the handshake protocol of the TLS protocol stack.

The second client 1120 may request the server 1140 to perform the first integrity verification of the first client 1110 on behalf of the first client 1110 (S110). In response to the first integrity verification request, the server 1140 may request the second client 1120 for the first verification information for the first integrity verification (S1120).

The second client 1120 may transmit a request to the first client 1110 for the first verification information in response to the request for the first verification information received from the server 1140 (S1130).

The first client 1110 may transmit the first verification information to the second client 1120 in response to the request for the first verification information received from the second client 1120 (S1140). The first verification information may include software configuration information of the first client 1110 and software configuration signature information generated by the first client 1110. In addition, the first client 1110 may transmit, to the second client 1120 together with the first verification information, the authentication message AUTH MESSAGE generated according to the authentication message generation protocol of the symmetric key method using the first verification information and the authentication key KEY_AUTH.

The second client 1120 may perform integrity verification by using the first verification information (S1150). For example, the second client 1120 may perform the integrity verification operation according to the authentication message verification protocol of the symmetric key method by applying the authentication key KEY_AUTH and by using the received first verification information and the authentication message AUTH MESSAGE received together with the first verification information.

The second client 1120 may transmit to the server 1140 the first verification information of the first client 1110, the integrity of which has been verified by the second client 1120 (S1160).

The server 1140 may perform the first integrity verification of the first client 1110 by using the first verification information received from the second client 1120 (S1170). Thereafter, the second client 1120 and the server 1140 may complete the TLS-based handshake (S1180).

Figure 19A:
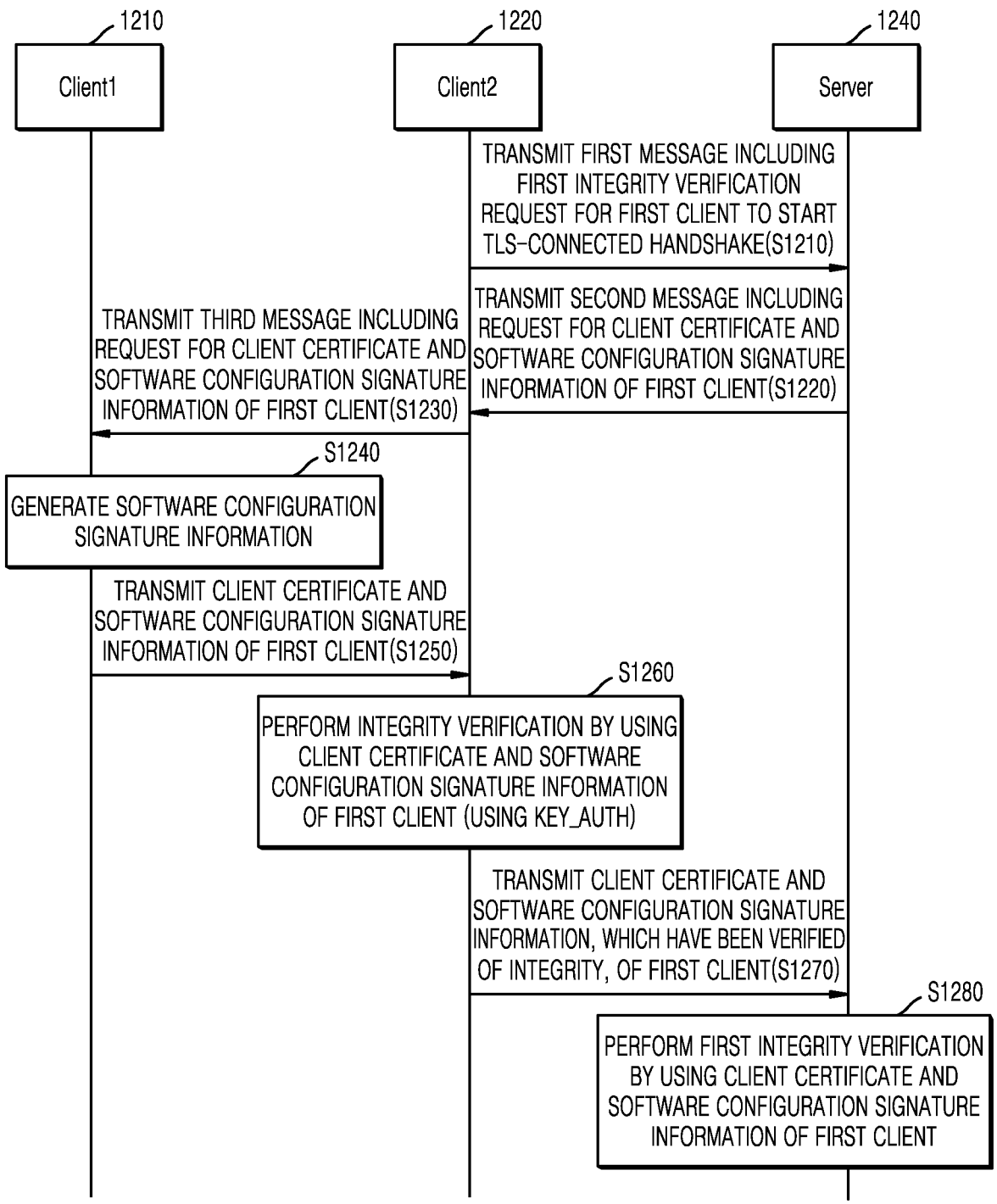
FIG. 19A is a flow diagram of a first integrity verification operation for a first client when a certificate includes software configuration information, as illustrated in FIG. 7B, according to some example embodiments.
Figure 19B:
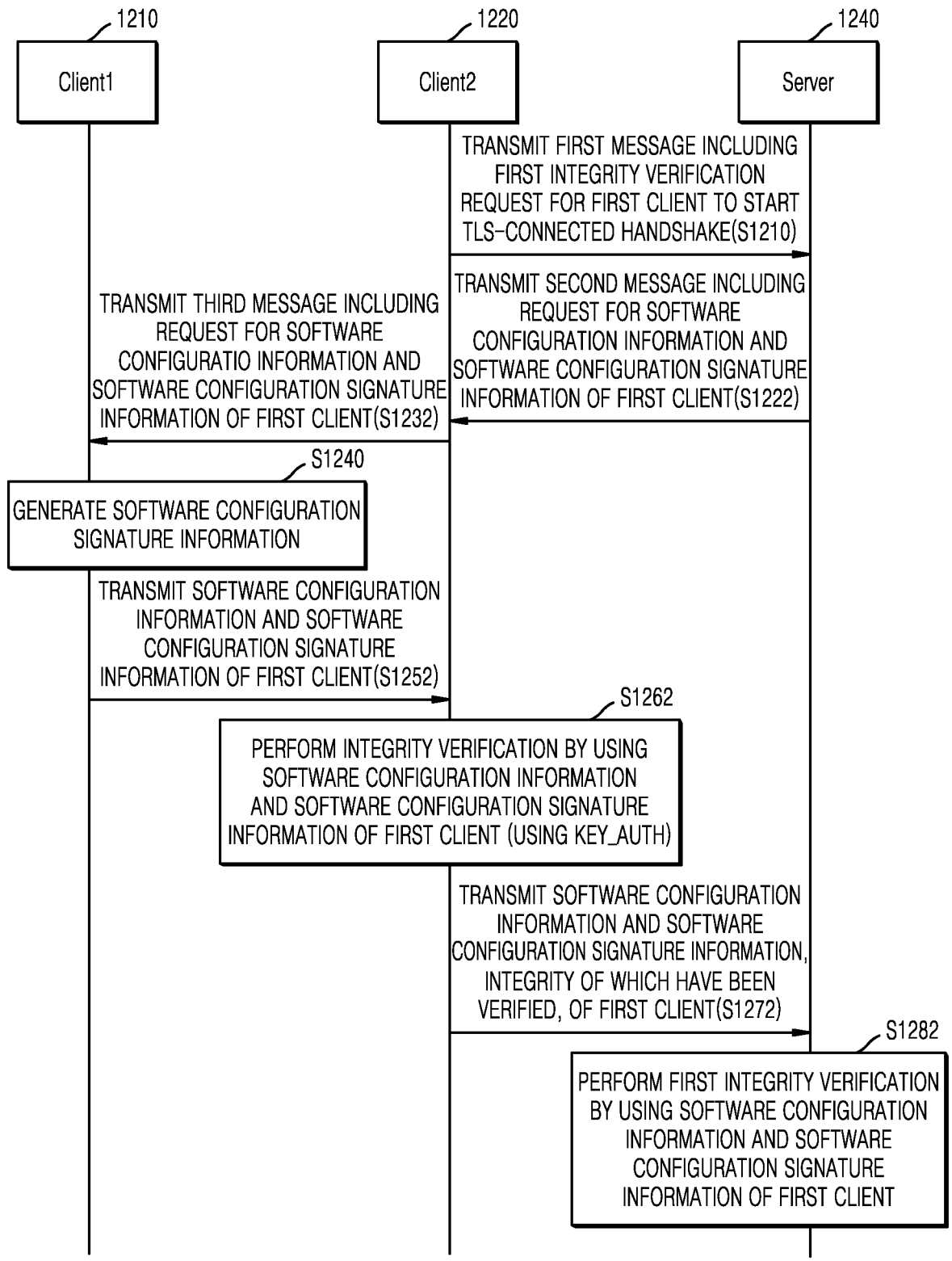
FIG. 19B is a flow diagram of the first integrity verification operation for the first client when the software configuration information is stored in a secure memory region, as illustrated in FIG. 7C, according to some example embodiments.

FIG. 19A is a flow diagram for explaining the first integrity verification operation for a first client 1210 when a certificate 30 includes the software configuration information SW_CI, as illustrated in FIG. 7B, according to some example embodiments. FIG. 19B is a flow diagram for explaining the first integrity verification operation for the first client 1210 when the software configuration information SW_CI is stored in the secure memory region 368, as illustrated in FIG. 7C, according to some example embodiments.

Referring to FIG. 19A, a second client 1220 may transmit to a server 1240 a first message including the first integrity verification request for the first client 1210 to start the handshake of the TLS connection (S1210).

The server 1240 may transmit to the second client 1220 a second message including a request for the client certificate and the software configuration signature information of the first client 1210 for the first integrity verification (S1220).

In response to the request from the server 1240, the second client 1220 may transmit to the first client 1210 a third message including the request for the client certificate and the software configuration signature information of the first client 1210 (S1230).

In response to the request from the second client 1220, the first client 1210 may generate the software configuration signature information (S1240). For example, the first client 1210 may generate the software configuration signature information in the secure execution environment (e.g., within a security element, in the form of a security chip) of the first client 1210.

The first client 1210 may transmit to the second client 1220 the certificate and the software configuration signature information of the first client 1210 (S1250). In addition, the first client 1210 may transmit, to the second client 1220 together with the certificate and software configuration signature information, the authentication message AUTH MESSAGE generated according to the authentication message generation protocol of the symmetric key method using the authentication key KEY_AUTH together with the certificate and the software configuration signature information of the first client 1210.

The second client 1220 may perform integrity verification by using the client certificate and the software configuration signature information of the first client 1210 (S1260). For example, the second client 1220 may perform the integrity verification operation according to the authentication message verification protocol of the symmetric key method using the authentication key KEY_AUTH and the received authentication message AUTH MESSAGE together with the received client certificate and the software configuration signature information.

The second client 1220 may transmit to the server 1240 the client certificate and the software configuration signature information of the first client 1210, which have been verified for integrity by the second client 1220 (S1270).

The server 1240 may perform the first integrity verification of the first client 1210 by using the client certificate and the software configuration signature information of the first client 1210 (S1280).

Referring to FIG. 19B, the second client 1220 may transmit to the server 1240 a first message including the first integrity verification request for the first client 1210 to start the handshake of the TLS connection (S1210).

The server 1240 may transmit to the second client 1220 a second message including a request for the software configuration information and the software configuration signature information of the first client 1210 for the first integrity verification (S1222).

In response to the request from the server 1240, the second client 1220 may transmit to the first client 1210 a third message including the request for the software configuration information and the software configuration signature information of the first client 1210 (S1232).

In response to the request from the second client 1220, the first client 1210 may generate the software configuration signature information (S1240). For example, the first client 1210 may generate the software configuration signature information in the secure execution environment (e.g., within a security element, in the form of a security chip) of the first client 1210.

The first client 1210 may read the software configuration signature information thereof and the software configuration information stored in the secure memory area thereof, and may transmit them to the second client 1220 (S1252). In addition, the first client 1210 may transmit to the second client 1220 the software configuration information and the software configuration signature information of the first client 1210, together with the authentication message AUTH MESSAGE that is generated according to the authentication message generation protocol of the symmetric key method using the authentication key KEY_AUTH and by using the software configuration information and the software configuration signature information of the first client 1210.

The second client 1220 may perform integrity verification by using the software configuration information and the software configuration signature information of the first client 1210 (S1262). For example, the second client 1220 may perform the integrity verification operation according to the authentication message verification protocol of the symmetric key method using the authentication key KEY_AUTH and the received authentication message AUTH MESSAGE together with the received software configuration information and software configuration signature information.

The second client 1220 may transmit to the server 1240 the software configuration information and the software configuration signature information of the first client 1210, which have been verified for integrity by the second client 1220 (S1272).

The server 1240 may perform the first integrity verification of the first client 1210 by using the software configuration information and the software configuration signature information of the first client 1210 received from the second client 1220 (S1282).

The first client 1210 may verify, by reading the software configuration information stored in the secure memory region, whether the software configuration information stored in the secure memory region has been tampered with, before transmitting the software configuration information to the second client 1220. In some example embodiments, when the first client 1210 stores the software configuration information in the secure memory region, the first client 1210 may also store security signature information in the secure memory region. The security signature information may be information that the software configuration information is encrypted with a certain key, and may indicate information necessary for verifying whether the software configuration information stored in the secure memory region has been tampered with. The first client 1210 may read the software configuration information and the security signature information stored in the secure memory region, decrypt the security signature information, and verify whether the software configuration information has been tampered with by comparing the decrypted security signature information with the read software configuration information. The first client 1210 may transmit to the second client 1220 only the software configuration information that has been verified for integrity (as being free from counterfeiting and/or falsification).

FIG. 20 is a flow diagram for explaining a verification operation in a handshake interval between a first client 1410, a second client 1420, and a server 1440, according to some example embodiments.

FIG. 20 mainly describes differences between the verification operation therein and the verification operation of FIG. 12.

The second client 1420 and the server 1440 may perform the handshake below based on the handshake protocol PT1 of FIG. 1B for a session connection for secure data communication.

Referring to FIG. 20, the second client 1420 may transmit a client hello message to the server 1440 to start the TLS-based handshake (S1400). Operation S1400 may be substantially the same as operation S400 of FIG. 12.

The second client 1420 may transmit to the server 1440 the first integrity verification request for the first client 1410 that includes the software configuration type information of the first client 1410 (S1402). The operation S1402 may be substantially the same as the operation S402 in FIG. 12, except that the second client 1420 transmits the first integrity verification request to the server 1440 on behalf of the first client 1410.

The server 1440 may transmit a server hello message to the second client 1420 in response to the client hello message (S1410). The operation S1410 may be substantially the same as the operation S410 of FIG. 12.

The server 1440 may transmit to the second client 1420 for the client certificate of the first client 1410 and the software configuration signature information of the first client 1410 in response to the client hello message from the second client 1420 and/or the first integrity verification request for the first client 1410 (S1412). The operation S1412 may be substantially the same as the operation S412 in FIG. 12, except that the server 1440 requests the second client 1420 to transmit the client certificate of the first client 1410 and the software configuration signature information of the first client 1410 on behalf of the first client 1410.

The server 1440 may transmit to the second client 1420 the second integrity verification request including the software configuration type information of the server 1440 (S1414). The operation S1414 may be substantially the same as the operation S414 of FIG. 12.

The server 1440 may transmit to the second client 1420 the server certificate and the software configuration signature information of the server 1440 so that the second client 1420 performs the second integrity verification and/or verification of the server certificate of the server 1440 (S1416). The operation S1416 may be substantially the same as the operation S416 of FIG. 12.

Thereafter, the server 1440 may transmit to the second client 1420 a server hello done message indicating that a message transmission in response to the client hello message has been completed (S1420). The operation S1420 may be substantially the same as the operation S420 of FIG. 12.

In response to the second integrity verification request (S1414), the second client 1420 may perform the second integrity verification by using the server certificate and the software configuration signature information of the server 1440 received from the server 1440 (S1430). The operation S1430 may be substantially the same as the operation S430 of FIG. 12.

In addition, when the second client 1420 receives the server certificate from the server 1440, the second client 1420 may perform verification of the server certificate of the server 1440 (S1432). The operation S1432 may be substantially the same as the operation S432 of FIG. 12.

The second client 1420 may transmit a request to the first client 1410 for the client certificate of the first client 1410 (S1440). In some cases, the second client 1420 may store the client certificate of the first client 1410 in advance, such that the operation S1440 may be an optional operation according to some example embodiments.

In addition, the second client 1420 may transmit a request to the first client 1410 for the software configuration signature information of the first client 1410 (S1442).

In response to the software configuration signature information request (S1442), the first client 1410 may generate the software configuration signature information of the first client 1410 (S1450).

The first client 1410 may transmit the client certificate of the first client 1410 to the second client 1420 (S1460). In some cases, the second client 1420 may store the client certificate of the first client 1410 in advance, such that the operation S1440 may be an optional operation according to some example embodiments.

The first client 1410 may transmit to the second client 1420 the generated software configuration signature information of the first client 1410 (S1462). In addition, the first client 1410 may transmit to the second client 1420 the client certificate and/or the software configuration signature information of the first client 1410 together with the authentication message AUTH MESSAGE generated according to the authentication message generation protocol of the symmetric key method using the authentication key AUTH_KEY.

The second client 1420 may perform integrity verification by using the client certificate and the software configuration signature information of the first client 1410 received from the first client 1410 (S1470). For example, the second client 1420 may perform, by using the received authentication message AUTH MESSAGE together with the received client certificate and the software configuration signature information of the first client 1410, the integrity verification operation according to the authentication message verification protocol of the symmetric key method using the authentication key KEY_AUTH.

The second client 1420 may transmit to the server 1440 the client certificate of the first client 1410 and the software configuration signature information of the first client 1410, which have been verified for integrity by the second client 1420 (S1480). The operation S1480 may be substantially the same as the operation S450 in FIG. 12, except that the second client 1420 transmits to the server 1440 the client certificate of the first client 1410 and the software configuration signature information of the first client 1410 on behalf of the first client 1410.

Thereafter, the second client 1420 may transmit to the server 1440 a client finished message indicating that the message transmission for the handshake has been completed (S1482). The operation S1482 may be substantially the same as the operation S454 in FIG. 12.

In response to the first integrity verification request for the first client 1410 (S1402), the server 1440 may perform the first integrity verification by using the client certificate of the first client 1410 and the software configuration signature information of the first client 1410 received from the second client 1420 (S1490). The operation S1490 may be substantially the same as the operation S460 of FIG. 12.

In addition, when the server 1440 receives the client certificate of the first client 1410 from the second client 1420, the server 1440 may perform verification of the client certificate of the first client 1410 (S1492). The operation S1492 may be substantially the same as the operation S462 in FIG. 12.

Thereafter, the server 1440 may transmit to the second client 1420 a server finished message indicating completion of the message transmission for the handshake (S1495). The operation S1495 may be substantially the same as the operation S472 of FIG. 12.

Figure 21:
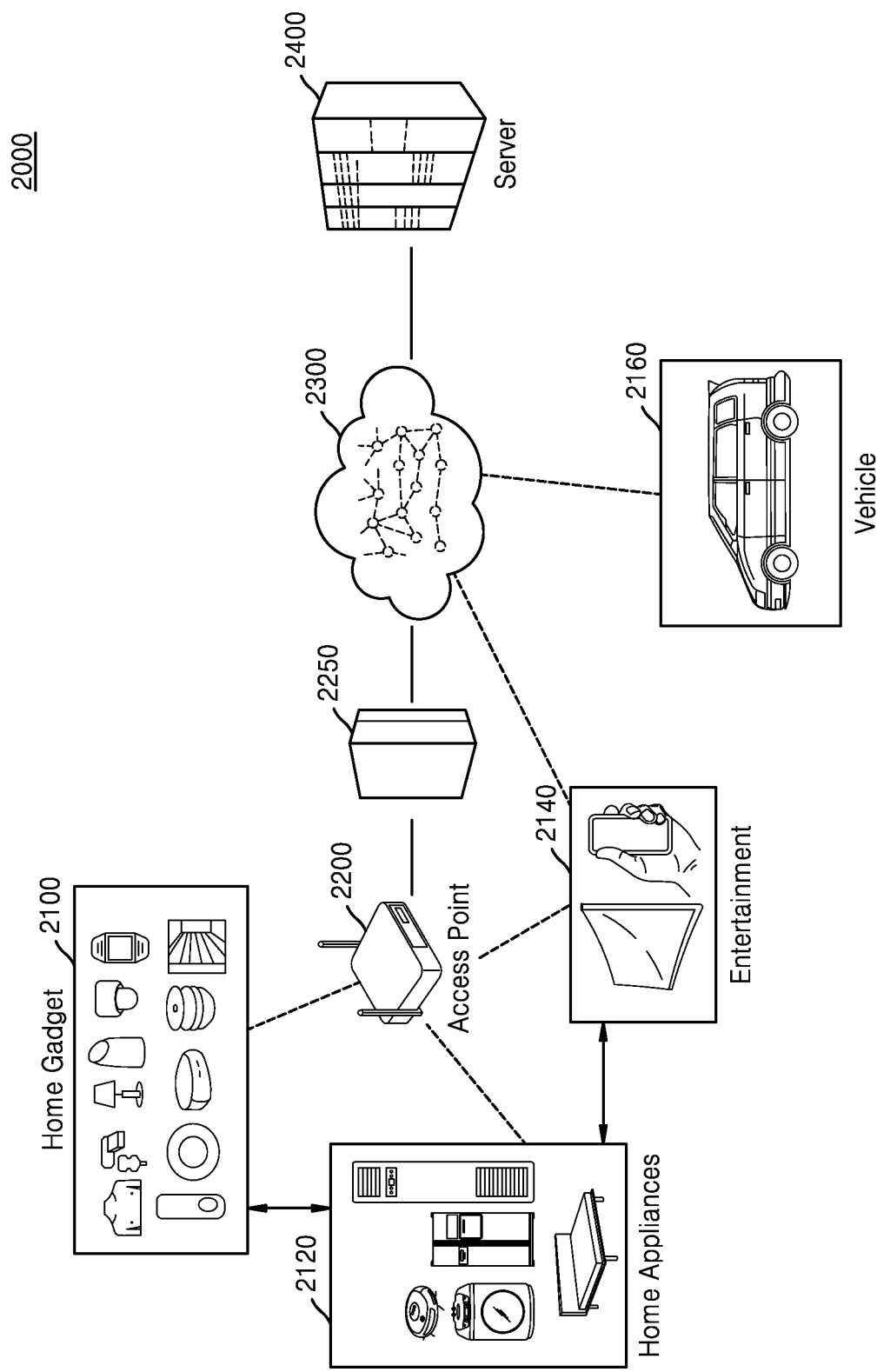
FIG. 21 is a conceptual diagram of an example of an Internet of things (IoT) network system, in which some example embodiments are applied.

FIG. 21 is a conceptual diagram of an example of an Internet of Things (IoT) network system 2000, in which some example embodiments are applied.

Referring to FIG. 21, the IoT network system 2000 may include a plurality of IoT devices 2100, 2120, 2140, and 2160, an access point 2200, a gateway 2250, a wireless network 2300, and a server 2400. The IoT may mean a network between things using wired or wireless communications.

The IoT devices 2100, 2120, 2140, and 2160 may be grouped according to characteristics of the IoT devices. For example, the IoT devices may be grouped into a home gadget group 2100, a home appliance/furniture group 2120, an entertainment group 2140, a vehicle group 2160, and the like. The IoT devices 2100, 2120, and 2140 may be connected to a communication network or other IoT devices through the access point (or a hub device) 2200. The access point 2200 may be embedded in a single IoT device, for example. The gateway 2250 may change a protocol to connect the access point 2200 to an external wireless network. The IoT devices 2100, 2120, and 2140 may be connected to an external communication network through the gateway 2250. The wireless network 2300 may include an Internet and/or a public network. The IoT devices 2100, 2120, 2140, and 2160 may be connected to the server 2400 providing a predetermined (or desired) service through the wireless network 2300, and a user may use the service through at least one of the IoT devices 2100, 2120, 2140, and 2160.

The IoT devices 2100, 2120, and 2140 may perform encryption security protocol-based communication with the access point 2200. According to some example embodiments, the IoT devices 2100, 2120, and 2140 may perform a handshake between the IoT devices 2100, 2120, and 2140 and the access point 2200 for the purpose of TLS-based data communication with the access point 2200. According to some example embodiments of the inventive concepts, the integrity of the IoT devices 2100, 2120, and 2140 and/or the access point 2200 may be verified in the handshake interval between the IoT devices 2100, 2120, and 2140 and the access point 2200. For encryption security protocol-based communication with the access point 2200, a session between the IoT devices 2100, 2120, and 2140 and the access point 2200 may be connected according to a result of the integrity verification. Also, some IoT devices 2160 (e.g., vehicles) may perform TLS-based communication with the server 2400. In this case, the integrity of the IoT devices 2160 and/or the server 2400 may be verified in the handshake interval between the IoT devices 2160 and the server 2400.

Units and/or devices according to one or more example embodiments may be implemented using hardware, a combination of hardware and software, or storage media storing software. Hardware may be implemented using processing circuity such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, etc., capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., one or more processors, CPUs, controllers, ALUs, DSPs, microcomputers, microprocessors, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor. In another example, the hardware device may be an integrated circuit customized into special purpose processing circuitry (e.g., an ASIC).

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Software and/or data may be embodied permanently or temporarily in any type of storage media including, but not limited to, any machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including tangible or non-transitory computer-readable storage media as discussed herein.

Storage media may also include one or more storage devices at units and/or devices according to one or more example embodiments. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the storage media, the computer programs, program code, instructions, or some combination thereof, may be specially designed and constructed for the purposes of the example embodiments, or they may be known devices that are altered and/or modified for the purposes of example embodiments.

While the inventive concepts have been particularly shown and described with reference to some example embodiments thereof, it will be understood that various changes in form and details may be made therein without departing from the spirit and scope of the following claims.

What is claimed is:

1. An encryption security, protocol-based communication method of supporting integrity verification between a client and a server, the encryption security protocol-based communication method comprising:
   receiving, by the server, a first message from the client, the first message comprising a request for a first integrity verification of the client so as to start a handshake of a transport layer security (TLS) connection;
   transmitting, by the server, a second message to the client, the second message comprising a request for first verification information for the first integrity verification;
   receiving, by the server, the first verification information from the client, and performing the first integrity verification by using the first verification information;
   and finishing the handshake and performing data communication between the client and the server based on a result of the first integrity verification,
   wherein performing the first integrity verification includes decrypting software configuration signature information provided in the first verification information and verifying the integrity of the client by comparing a value obtained by decrypting the software configuration signature information of the client by using a first public key with a software configuration value of the client included in a client certificate.

2. The encryption security protocol-based communication method of claim 1, wherein the first message further comprises a client hello message comprising at least one of TLS protocol version information of the client, session ID field information of the client, first secure random data, a list of encryption algorithms supportable in the client, and a list of compression methods supportable in the client.

3. The encryption security protocol-based communication method of claim 2, wherein the second message further comprises a server hello message comprising at least one of TLS protocol version information of the server, session ID field information of the server, second secure random data, an encryption algorithm selected from the list of the encryption algorithms, and a compression method selected from the list of the compression methods.

4. The encryption security protocol-based communication method of claim 1, wherein the request for the first integrity verification comprises software configuration type information of the client.

5. The encryption security protocol-based communication method of claim 1, wherein the first verification information comprises the client certificate, software configuration type information of the client, and the software configuration value of the client, and
the software configuration type information of the client and the software configuration value of the client are stored in a secure memory region of the client.

6. The encryption security protocol-based communication method of claim 1, wherein the first verification information comprises the client certificate, and
the client certificate comprises a first public key, software configuration type information of the client, and the software configuration value of the client.

7. The encryption security protocol-based communication method of claim 6, wherein the first verification information further comprises the software configuration signature information of the client, and
the client generates the software configuration signature information of the client in response to the request for the first verification information by encrypting a current software configuration value of the client by using a first private key corresponding to the first public key.

8. The encryption security protocol-based communication method of claim 7, wherein the software configuration value of the client and the current software configuration value of the client are hash values generated by using a hash algorithm.

9. The encryption security protocol-based communication method of claim 6, wherein the performing of the first integrity verification further comprises performing, by the server, verification of the client certificate.

10. The encryption security protocol-based communication method of claim 6, wherein the software configuration type information of the client is information indicating one of a non-configuration type, a process map type of the client, a security policy type of the client, a process map-security policy type, and a user-defined type.

11. The encryption security protocol-based communication method of claim 6, wherein the software configuration type information of the client and the software configuration value of the client are included in an extension region of the client certificate.

12. The encryption security protocol-based communication method of claim 1, wherein the second message further comprises a request for a second integrity verification of the server and second verification information for the second integrity verification, and
the encryption security protocol-based communication method further comprises performing, by the client, the second integrity verification by using the second verification information.

13. The encryption security protocol-based communication method of claim 12, wherein the second verification information comprises a server certificate, and
the server certificate comprises a second public key, software configuration type information of the server, and a software configuration value of the server.

14. The encryption security protocol-based communication method of claim 13, wherein the second verification information further comprises software configuration signature information of the server, and
the server generates the software configuration signature information of the server by encrypting a current software configuration value of the server by using a second private key corresponding to the second public key.

15. The encryption security protocol-based communication method of claim 14, wherein the performing of the second integrity verification comprises comparing, by the client, a value obtained by decrypting the software configuration signature information of the server by using the second public key with the software configuration value of the server.

16. The encryption security protocol-based communication method of claim 13, wherein the performing of the second integrity verification further comprises performing, by the client, verification of the server certificate.

17. The encryption security protocol-based communication method of claim 1, wherein the encryption security protocol is a secure socket layer (SSL)/transport layer security (TLS) protocol.

* * * * *